(12) United States Patent
Bazan et al.

(10) Patent No.: US 7,754,832 B2
(45) Date of Patent: *Jul. 13, 2010

(54) BLOCK COPOLYOLEFINS POSSESSING A TAPERED STRUCTURE

(75) Inventors: Guillermo C. Bazan, Santa Barbara, CA (US); Steve Diamanti, Santa Barbara, CA (US); Edward J. Kramer, Santa Barbara, CA (US); Vikram Khanna, Goleta, CA (US); Glenn H. Frederickson, Santa Barbara, CA (US); Atsushi Hotta, Higashikurume (JP)

(73) Assignee: The Regents of the University of California, Oakland, CA (US)

( * ) Notice: Subject to any disclaimer, the term of this patent is extended or adjusted under 35 U.S.C. 154(b) by 1076 days.

This patent is subject to a terminal disclaimer.

(21) Appl. No.: 11/208,395

(22) Filed: Aug. 19, 2005

(65) Prior Publication Data

US 2006/0094827 A1 May 4, 2006

Related U.S. Application Data

(63) Continuation-in-part of application No. 10/377,491, filed on Feb. 28, 2003, now Pat. No. 7,259,214, and a continuation-in-part of application No. 10/378,957, filed on Mar. 3, 2003.

(51) Int. Cl.
  *C08F 4/80* (2006.01)
  *C08F 220/10* (2006.01)
  *C08F 212/06* (2006.01)
  *C08F 297/06* (2006.01)
(52) U.S. Cl. .......................... 526/117; 526/79; 526/118; 526/171; 526/281; 526/308; 526/328.5; 526/329; 526/347; 525/242
(58) Field of Classification Search .................. 526/79, 526/117, 118, 171, 281, 308, 328.5, 329, 526/347; 525/242
See application file for complete search history.

(56) References Cited

U.S. PATENT DOCUMENTS

| 4,104,330 | A | | 8/1978 | Danzig et al. | |
| 5,169,905 | A | | 12/1992 | Hashiguchi et al. | |
| 5,849,847 | A | * | 12/1998 | Quirk | 525/193 |
| 6,838,540 | B2 | * | 1/2005 | Mitani et al. | 526/348 |
| 2004/0024149 | A1 | | 2/2004 | Bazan et al. | |
| 2004/0204556 | A1 | * | 10/2004 | Matyjaszewski et al. | 526/329.7 |

FOREIGN PATENT DOCUMENTS

WO   WO-01/55231   *  8/2001

OTHER PUBLICATIONS

Kryszewski, M. *Polym. Adv. Tech.*, 1998, 9, 244-259.
Matyjaszewski, K.; Ziegler, M. J.; Arehart, S. V.; Greszta, D.; Pakula, T. *J. Phys. Org. Chem.*, 2000, 13, 775-786.
Fayt, R.; Jerome, R.; Teyssie, P. *J. Polym. Sci., Polym. Phys. Ed.*, 1982, 20, 2209-2217.
Harrats, C.; Fayt, R.; Jerome, R.; Blacher, S. *J. Polym. Sci., Part B Polym. Physics*, 2003, 41, 202-216.
Harrats, C.; Fayt, R.; Jerome, R. *Polymer*, 2002, 43, 863-873.
Lefebvre, M. D.; Olvera de la Cruz, M.; Shull, K. R. *Macromolecules*, 2004, 37, 1118-11123.
Shull, K. R. *Macromlecules*, 2002, 35, 8631-8639.
Aksimentiev, A.; Holyst, R. *J. Chem. Phys.*, 1999, 111, 2329-2339.
Hodrokoukes, P.; Floudas, G.; Pispas, S.; Hadjichristidis, N. *Macromolecules*, 2001, 34, 650-657.
Neugebauer, D.; Matyjaszewski, K. *Polym. Prepr. (Am. Chem. Soc., Div. Polym. Chem.)*, 2003, 44, 508-509.
Buzin, A. I.; Pyda, M.; Costanzo, P.; Matyjaszewski, K.; Wunderlich, B. *Polymer*, 2002, 43, 5563-5569.
Greszta, D.; Matyjaszewski, K. *Polym. Prepr. (Am. Chem. Soc., Div. Polym. Chem.)*, 1996, 37, 569-570.
Mignard, E.; Leblanc, T.; Bertin, D.; Guerret, O.; Reed, W. F. *Macromolecules*, 2004, 37, 966-975.
Gray, M. K.; Nguyen, S. T.; Zhou, H.; Torkelson, J. M. *Polym. Prepr. (Am. Chem. Soc., Div. Polym. Chem.)*, 2002, 43, 112-113.
Asai, S. *Polym. Prepr. (Am. Chem. Soc., Div. Polym. Chem.)*, 1996, 37, 706-707.
Moctezuma, S. A.; Martinez, E. N. *Polym. Prepr. (Am. Chem. Soc., Div. Polym. Chem.)*, 1996, 37, 637-638.
Hashimoto, T.; Tsukahara, Y.; Tachi, Y.; Kawai, H. *Macromolecules*, 1983, 16, 648.
Cunningham, R. E. *J. Appl. Polym. Sci.*, 1978, 22, 2907-2913.
Ishizu, K.; Sunahara, K.; Asai, S. *Polymer*, 1998, 39, 953.

(Continued)

*Primary Examiner*—Roberto Rábago
(74) *Attorney, Agent, or Firm*—Berliner & Associates

(57) ABSTRACT

A method of preparing a polymer having a tapered block copolymer structure. The method comprises polymerizing a first olefin monomer and a different second olefin monomer in the presence of a catalyst supporting living or quasi-living polymerization. In certain embodiments, the catalyst comprises two neutral metal complexes. In preferred embodiments, a tapered block copolymer structure is formed by adding one monomer in a single batch at the start of the polymerization reaction, and adding a second monomer throughout the course of the reaction. The present invention also provides polymers having one or more tapered block copolymer sections, and compositions based on these polymers.

20 Claims, 14 Drawing Sheets

OTHER PUBLICATIONS

Sardelis, K.; Michels, H. J.; Allen, G. *Polymer*, 1984, 25, 1011-1019.

Sardelis, K.; Michels, H. J.; Allen, G. *Polymer*, 1987, 28, 244-250.

Yu, G. E.; Mistry, D.; Ludhera, S.; Heatley, F.; Attwood, D.; Booth, C. *J. Chem. Soc., Faraday Trans. 1*, 1997, 93, 3383-3390.

Mecking, S.; Johnson, L. K.; Wang, L.; Brookhart, M.; *J. Am. Chem. Soc.* 1998, 120, 888.

Younkin, T. R.; Connor, E. F.; Henderson, J. I.; Freidrich, S. K.; Grubbs, R. H.; Bansleben, D. A. *Science* 2000, 287, 460.

Connor, E. F.; Younkin, T. R.; Henderson, J. I.; Hwang, S.; Grubbs, R. H.; Roberts, W. P.; Litzau, J. J. *J. Polym Sci. Part A: Polym. Chem.* 2002, 40, 2842.

Benedikt, G.M.; Elce, E.; Goodall, B. L.; Kalamarides, H. A.; McIntosh, L. H. III; Rhodes, L. F.; Selvy, K. T.; Andes, C.; Oyler, K.; Sen, A. *Macromolecules* 2002, 35, 8978.

Matthew, J. P.; Reinmuth, A.; Swords, N.; Risser, W. *Macromolecules* 1996, 29, 2755.

Goodall, B. L.; McIntosh, L. H.; Rhodes, L. F. *Macromolecular Symp.* 1995, 89, 421.

Jansen, J.C., Mendichi, RI, Locatelli, P. and Tritto, I., Macromol. Rapid Commun. 2001, 22, 1394-1398).

Diamanti, S. J.; Ghosh, P.; Shimizu, F.; Bazan, G. C. *Macromolecules* 2003, 9731.

Diamanti, S.J.; Khanna V.; Hotta, A.; Yamakawa, D.; Shimizu, F.; Kramer, E. J.; Fredrickson, G. H.; Bazan, G. C. *J. Am. Chem. Soc.* 2004, 126, 10528.

Lee, B. Y.; Bazan, G. C.; Vela, J.; Komon, Z. J. A.; Bu, X. *J. Am. Chem. Soc.* 2001, 123, 5352; Schunn, R.A., Ittel, S.D., Cushing, M.A., Inorg. Synth. 1990, 28, 94.

\* cited by examiner

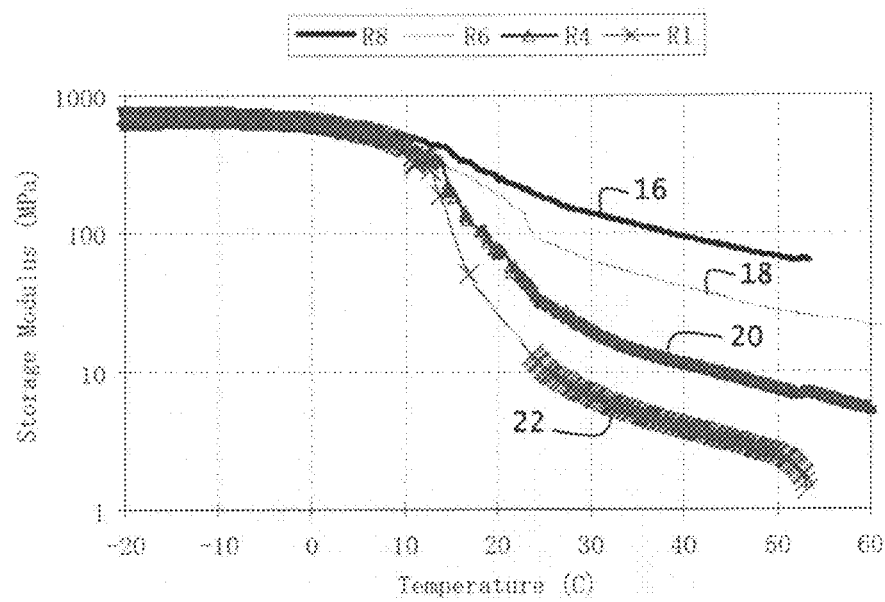
FIGURE 6A. Storage modulus
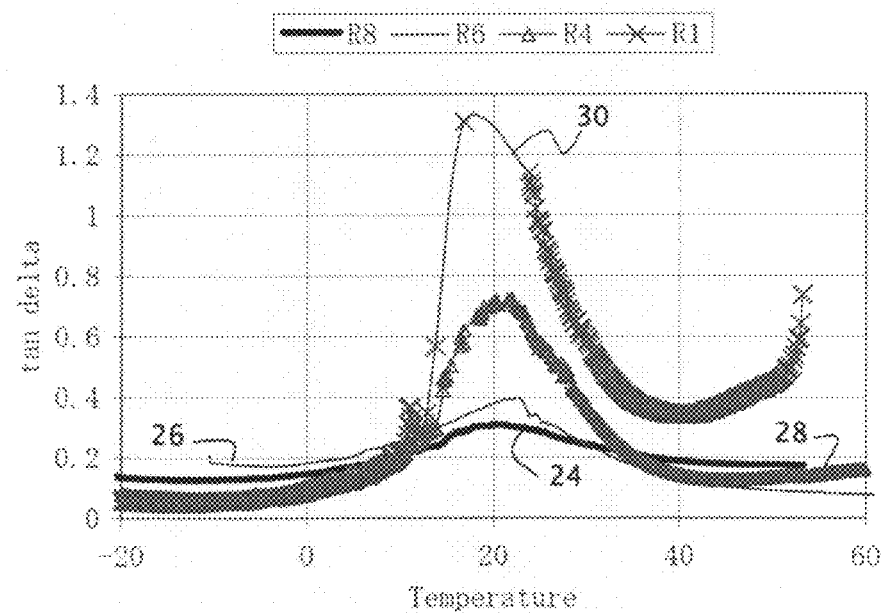
Figure 6B. tan *

(RCO)₂O, DMAP (cat.), PyH, CH₂Cl₂, r.t., 16 h

R = ethyl, propyl, and n-butyl

BLOCK COPOLYOLEFINS POSSESSING A TAPERED STRUCTURE

CROSS-REFERENCE TO RELATED APPLICATIONS

This application is a continuation in part of U.S. patent application Ser. No. 10/377,491, filed on Feb. 28, 2003, now U.S. Pat. No. 7,259,214, and U.S. patent application Ser. No. 10/378,957, filed on Mar. 3, 2003.

BACKGROUND

1. Field of Invention

This invention relates generally to the copolymerization of olefin monomers and in particular to the formation of olefin-containing tapered block polymers.

2. Related Art

Gradient, or tapered, copolymers have a chemical structure with a gradual change of composition along the polymer chain from one monomer unit to another that is intermediate between block- and alternating-copolymer structures (1,2). FIG. 1 shows schematically the arrangement of different copolymers, including gradient copolymers, with open and closed circles representing two different monomer units. The gradient structures can be tuned to combine the properties of the different homopolymers. If the average chain length is sufficiently long, the degree of incompatibility between the two monomer units high, and the gradient profile provides chain ends that contain mainly one type of monomer unit, then microphase separated structures similar to those observed in traditional block copolymers can be observed. These special types of gradient copolymers are called tapered block copolymers and are technically relevant since they can be tailored to be efficient compatibilizers of polymer blends and can be superior to block copolymers for this application (3, 4, 5). The phase morphology and interfacial energy in tapered block copolymers is modulated by the length and sharpness of the composition gradient (6-10)

Living polymerization methods are required for the synthesis of gradient structures, since to achieve similar average composition drifts in each polymer chain, all chains must be initiated simultaneously and must participate in the propagation sequence until the end of the reaction (2). Because of this requirement, gradient copolymers have been synthesized primarily by controlled radical polymerization (11-15) and anionic polymerization methods (16-23). Tapered block copolymers derived from ethylene and functionalized comonomers have not been reported, primarily because of the limited options for living polymerization initiators (24-29). Such polymers can make a substantial impact in designing blends of polyethylene and polar engineering plastics because the polarity gradient along their chain would reduce the interfacial energy and lead to better mixing. Additional applications include, for example, use as high temperature adhesives and as coatings for polar substrates.

There are seven accepted criteria for living polymerizations with living catalyst systems. These are: 1) the polymerization proceeds to a complete monomer conversion and restarts upon further addition of the monomer; 2) linear dependence of $M_n$ with time; 3) the number of active sites remains constant during polymerization; 4) the molecular weight can be precisely controlled by stoichiometry; 5) a narrow PDI; 6) sequential monomer addition results in a block copolymer; and 7) an end-functionalized copolymer can be synthesized. Systems that partially fulfill this list of criteria are termed "quasi-living". Quasi-living catalysts for ethylene and norbornene copolymerization have been described (30). However, no functionalized norbornene derivatives were copolymerized, and no tapered block copolymers were described.

Catalysts for quasi-living polymerization of olefin monomers are disclosed in U.S. application Ser. Nos. 10/377,491 now U.S. Pat. No. 7,259,214 and 10/378,957, both prior applications of one of the present inventors and herein incorporated by reference. The catalysts are formed from a combination of two neutral metal complexes (31, 32). These catalysts use Group VIII transition metals rather than the Group IV transition metals more commonly used in catalysts. Compared to the early transition metals, the late transition metals are more tolerant of olefin monomers with functional groups.

Olefin-containing tapered block copolymers have application as thermoplastic elastomers, adhesives, polymer coatings, oxygen barrier films, and polymer blend compatibilizers, as well as other uses. However, few methods are available for synthesizing such polymers. The development of new methods of olefin copolymerization are required to take full advantage of the uses offered by olefin-containing tapered block copolymers.

SUMMARY

The present invention provides methods and compositions relating to olefin-containing tapered block copolymers. The copolymers are prepared by polymerizing two olefin monomers in a living or quasi-living manner. The catalyst for the polymerization is a combination of two neutral metal complexes.

In one aspect, the present invention provides a method of preparing a polymer. The method comprises polymerizing a first olefin monomer and a second olefin monomer in the presence of a catalyst under conditions sufficient to produce a tapered block copolymer structure, where the catalyst supports living or quasi-living polymerization. The polymerization of different first and second olefin monomers leads to the tapered block copolymer structure.

In one embodiment, the catalyst comprises a combination of two neutral metal complexes, represented by one of the following formulas (I)-(IV):

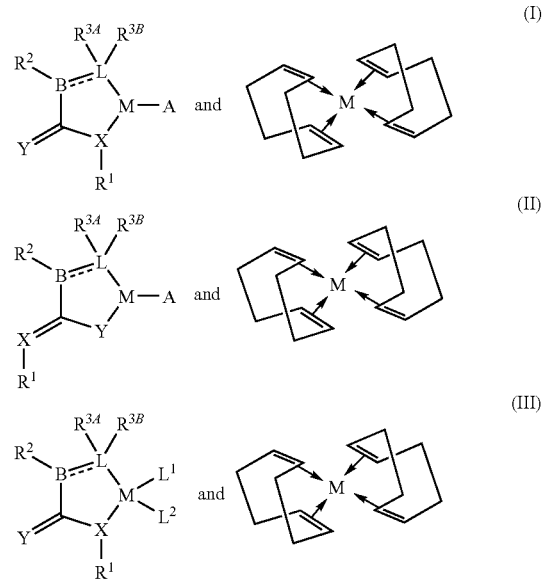

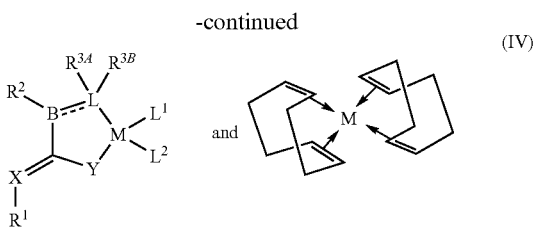

(IV)

where a) M is a Group VIII transition metal, particularly, Ni, Pt, or Pd;

b) A is a three electron donor, particularly, a π-allyl, substituted π-allyl, π-benzyl, or substituted π-benzyl;

c) X is N or P;

d) Y is O, $CH_2$ or S;

e) L is N or P or a structure capable of forming a two electron donor ligand;

f) $L^1$ is a neutral monodentate ligand and $L^2$ is a monoanionic monodentate ligand, or $L^1$ and $L^2$ taken together are a monoanionic bidentate ligand;

g) B is an atom or group of atoms connecting covalently the unsaturated carbon and L;

h) ---represents a single or double bond;

i) $R^1$, $R^2$, $R^{3A}$ and $R^{3B}$ are the same or different, and are each independently hydrogen, hydrocarbyl, or a substituted hydrocarbyl having one or more functional groups or having one or more hydrocarbyl groups; and j) $R^{3B}$ is nothing when B is connected to L by a double bond.

In another aspect, the present invention provides olefin-containing tapered block polymers. The polymers contain a tapered block copolymer structure and comprise two different olefin monomer units. In a preferred embodiment, one of the monomer units is derived from an olefin monomer of the formula $R^7CH=CH_2$, wherein $R^7$ is hydrogen, a hydrocarbyl group, or a substituted hydrocarbyl group having one or more functional groups or having one or more substituted or non-substituted hydrocarbyl groups.

Also provided are compositions comprising one or more olefin-containing tapered block polymers of the present invention. Examples of such compositions include, but are not limited to, thermoplastic elastomers, adhesives, polymer coatings, oxygen barrier films, and polymer blend compatibilizers.

The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

FIG. 6A is a graph of the storage modulus of various tapered block copolymers;

FIG. 6B is a graph of the tan δ of various tapered block copolymers;

DETAILED DESCRIPTION

Figure 1:
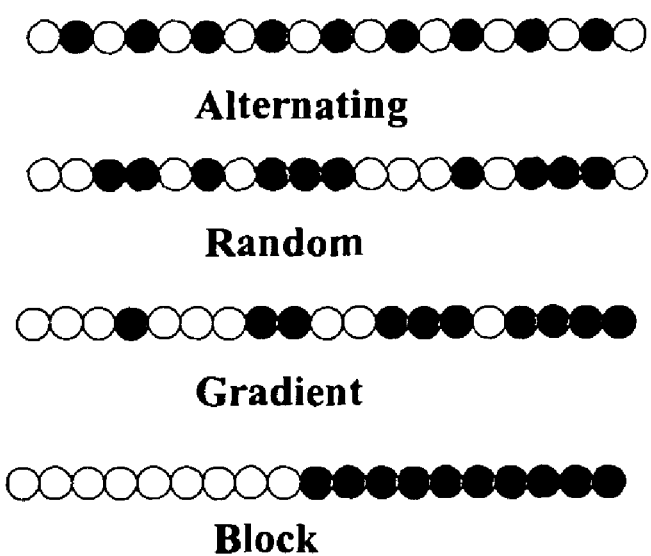
FIG. 1 is a schematic drawing of different types of copolymer arrangements.

The present invention relates to polymers having a tapered block copolymer structure. As described above, a tapered block copolymer structure is a chemical structure where one end of a polymer chain or chain section contains mainly one type of monomer unit, the other end of the polymer chain or chain section contains mainly another type of monomer unit, and a gradual change in composition of one monomer unit to the other occurs along the length of the polymer chain or chain section. As used herein, the term "monomer" refers to a molecule that can undergo polymerization to produce a polymer. The term "monomer unit" refers to the reacted form of a monomer in a polymer produced by polymerization reactions involving the monomer. For example, the "monomer unit" derived from ethylene is represented by —CH2-CH2-.

As used herein, the term "tapered block polymer" means a polymer that contains a tapered block copolymer structure or organization. In a tapered block polymer, either the entire polymer chain can have a tapered block copolymer structure, or a section of the polymer chain can have such a structure. A tapered block polymer can have more than one tapered block copolymer section. Examples of tapered block polymer chains include the following:

AA-AB-BB; AA-AB-BB-AA-AB-BB; AA-AB-BB-CC-CB-BB;

AA-AB-BB-AA-AB-BB-AA-AB-BB; AA-AB-BB-BB-BB where A, B and C represent monomer units, double letters AA, BB and CC represent blocks of monomer units, and double letters AB and CB represent gradient blocks from one monomer unit to the other.

In accordance with the present invention, the polymerization of first and second olefin monomers can be carried out with one of the catalysts of formulas (I)-(IV). In preferred embodiments, the Group VIII transition metal in the catalyst is nickel. In some embodiments, the catalyst is formed from a combination of one metal complex, L($^i$Pr$_2$)Ni($\eta^1$-CH$_2$Ph)(PMe$_3$), where L=N-(2,6-diisopropylphenyl)-2-(2,6-diisopropylphenyl-imino)propanamide, and another metal complex, bis(1,5-cyclooctadiene)nickel [or Ni(COD)$_2$].

In formulas (I)-(IV), B can be any atom or group of atoms capable of covalently linking the unsaturated carbon to the donor ligand L, provided that B does not prevent catalysis and that B has an appropriate valency to satisfy the linking requirements. Examples of B include divalent or trivalent hydrocarbyl, substituted hydrocarbyl, heteroatom connected hydrocarbyl, heteroatom connected substituted hydrocarbyl, substituted silicon (IV), boron (III), N(III), P(III), O, S and Se. By "heteroatom" is meant an atom other than carbon or hydrogen. Preferred heteroatoms include oxygen, nitrogen, phosphorus, sulfur, selenium, arsenic, chlorine, bromine, silicone and fluorine. Preferably, the ring structure formed by L, B, the unsaturated carbon, X and M has 5-30, 5-25, 5-20, 5-15, 5-10, or 5 ring members.

The π-allyl group in formulas (I) and (II) is a monoanionic group with three sp$^2$ carbon atoms bound to a metal center in a η$^3$-fashion. Any of the three sp$^2$ carbon atoms may be substituted, for example, with a hydrocarbyl or a substituted hydrocarbyl group. Examples of π-allyl groups include, but are not limited to, the following:

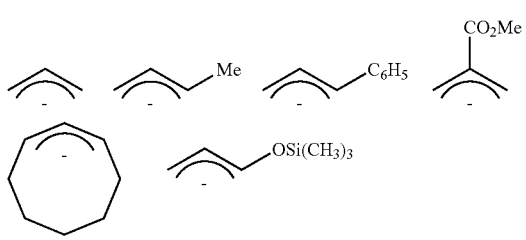

The π-benzyl group in formulas (I) and (II) is a π-allyl group where two of the sp$^2$ carbon atoms are part of an aromatic ring. Examples of π-benzyl groups include, but are not limited to, the following:

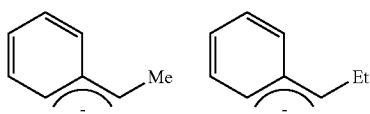

In formulas (III) and (IV), L$^2$ is a monoanionic monodentate ligand, and L$^1$ and L$^2$ taken together are a monoanionic bidentate ligand, provided that the monoanionic monodentate ligand or the monoanionic bidentate ligand can add to the olefins being polymerized.

The first olefin monomer and the second olefin monomer for polymerization can be any olefin capable of forming a tapered block copolymer structure. Examples of such olefins include, but are not limited to, R$^4$CH=CH$_2$, cyclopentene, styrene, norbornene, a polar olefin of the general formula H$_2$C=CR$^5$(CH$_2$)$_s$CO$_2$R$^6$, a substituted cyclopentene, a substituted styrene, and a norbornene derivative having one or more functional groups or having one or more substituted or non-substituted hydrocarbyl groups. In these examples, R$^4$, R$^5$ and R$^6$ are each independently hydrogen, a hydrocarbyl group, or a substituted hydrocarbyl having one or more functional groups or having one or more substituted or non-substituted hydrocarbyl groups. Also, s is an integer from 0 to 100.

The term "hydrocarbyl group" refers to any monovalent or divalent linear, branched or cyclic group that contains only carbon and hydrogen atoms. Examples of such groups include, but are not limited to univalent groups such as alkyl, alkenyl, alkynyl, aryl, aralkyl, cycloalkyl, cycloalkenyl or cycloalkynyl, and divalent groups such as alkylene, alkenylene, alkynylene or arylene. Preferably, the hydrocarbyl group contains 1-30 carbon atoms.

In general, "substituted" refers to a hydrocarbyl group in which one or more bonds to a hydrogen atom contained within the group are replaced by a bond to a non-hydrogen atom of a substituent group. Examples of non-hydrogen atoms include, but are not limited to, carbon, oxygen, nitrogen, phosphorus, sulfur, selenium, arsenic, chlorine, bromine, silicone and fluoride. Examples of substituent groups include halo, perhaloalkyl such as trifluoromethyl, hydroxy, amino, alkoxy, aryloxy, carboxy, mercapto, cyano, nitro, ester, ether, thioether, trialkylsilyl, amide and hydrocarbyl groups.

The term "functional group" refers to any reactive substituent, provided that the substituent does not prevent the preparation of a polymer having a tapered block copolymer structure. Examples of functional groups include, but are not limited to, hydroxy, cyano, halo, nitro, ester, ether, amino and carboxy groups.

In certain embodiments, one monomer is ethylene, and the other monomer is norbornene or a norbornene derivative having one or more functional groups.

In preferred embodiments, one of the monomers is a 5-norbenen-2-yl derivative of the following structure (V):

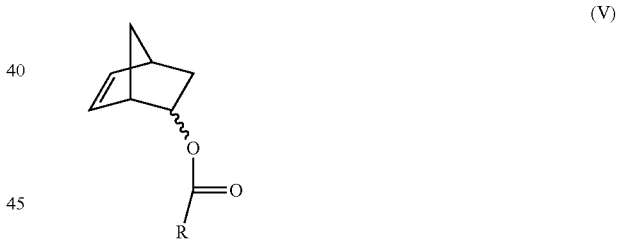

where R is an alky group. Preferably, R is a C$_1$-C$_{17}$ alkyl group.

As in known, a polymerization reaction can be conducted in solution, in a slurry, or in a gas phase process.

Various additives can be included with tapered block copolymers to prepare compositions with desirable properties. Such additives include pigments, reinforcing fillers, extenders, blowing agents, colorants, antioxidants, heat stabilizers, UV stabilizers, lubricants, flame retarding agents, anti-static agents, and other additives well known in the art.

In general, a tapered block copolymer structure can be prepared by controlling the rate of addition of the two monomers, or by polymerizing two monomers having different reactivity ratios. In the first case, when two monomers with comparative reactivity ratios are copolymerized, the two monomers can be added at different rates to the polymerization reaction to achieve a tapered block copolymer structure. For example, one monomer can be gradually added at increasing quantities during polymerization, particularly after allowing a short period of time for the other monomer to form a homopolymer block. Alternatively, one monomer can decrease during the course of polymerization, while the other is provided throughout the reaction. Other addition schemes with different relative addition rates of the two monomers will be apparent to those skilled in the art.

In one embodiment, a tapered block copolymer structure is prepared by reducing a first monomer during the course of polymerization to a level such that incorporation of the first monomer into the polymer becomes essentially zero, while providing a second monomer at a level sufficient for incorporation into the polymer throughout the course of polymerization. The incorporation of the first monomer in a polymer chain section is "essentially zero" when the physical properties of the polymer chain section reflect only the properties of the second monomer.

In a preferred embodiment, the tapered block polymer is prepared by depleting the first monomer during the course of polymerization and providing the second monomer throughout the course of polymerization. One way of accomplishing this is by a batch or semi-batch method, whereby one olefin monomer is added in a single batch at the beginning polymerization, while the other olefin monomer is added throughout the course of the polymerization. As the reaction progresses, the monomer added in a single batch will deplete by incorporation into the polymer structure, leading to a tapered structure. The monomer added throughout the course of polymerization can be added at different times during polymerization, or continuously.

In further embodiments, an additional amount of the reduced-level monomer can be added to the polymerization reaction, producing a polymer chain having a second tapered block copolymer section. This step can be repeated when the additional amount of the first monomer is reduced, and can be repeated throughout the course of polymerization as the first monomer becomes reduced or depleted, thus forming copolymers having multiple tapered block copolymer sections. In certain embodiments, a third monomer can be added to the polymerization reaction instead of an additional amount of the reduced or depleted monomer. This can produce polymer chains having multiple tapered block copolymer sections containing different comonomer pairs.

A polymer having one tapered block copolymer section is referred to herein as a "tapered diblock" polymer. A polymer having two tapered block copolymer sections is referred to herein as a "tapered tetrablock" polymer. A "tapered multiblock" polymer means a polymer having two or more tapered block copolymer sections.

An alternative way to prepare a tapered block copolymer structure is by polymerizing two monomers having different reactivity ratios. The different reactivity ratios can lead to preferential polymerization of one of the monomers. Due to its faster rate of insertion into the polymer chain, this monomer can be consumed preferentially at the beginning of a polymerization reaction. After enough of this monomer has been consumed, the slower propagating monomer (at a higher concentration in the reaction medium), will have a higher statistical probability of chain incorporation due to its enrichment in the reaction media. At this point, the incorporation of the slower propagating monomer is preferred, leading to a segment composed of primarily this second monomer. The entire process can lead to a tapered block copolymer structure. Both the formation of tapered block copolymer structures by controlled addition rate and by polymerization of monomers having different reactivity ratios are considered to be within the scope of the present invention.

Tapered block polymers according to the present invention preferably contain a tapered block copolymer structure prepared from two different olefin monomers, one of which is of the formula $R^7CH=CH_2$, wherein $R^7$ is hydrogen, a hydrocarbyl group, or a substituted hydrocarbyl group having one or more functional groups or having one or more substituted or non-substituted hydrocarbyl groups. Preferably, $R^7$ is hydrogen (monomer is ethylene). In preferred embodiments, the second olefin monomer is selected from the group consisting of $R^4CH=CH_2$, cyclopentene, styrene, norbornene, a polar olefin of the general formula $H_2C=CR^5(CH_2)_sCO_2R^6$, a substituted cyclopentene, a substituted styrene, and a norbornene derivative having one or more functional groups or having one or more substituted or non-substituted hydrocarbyl groups, wherein $R^4$, $R^5$ and $R^6$ are each independently hydrogen, a hydrocarbyl group, or a substituted hydrocarbyl group having one or more functional groups or having one or more substituted or non-substituted hydrocarbyl groups, and s is an integer from 0 to 100.

The relative amounts of the first and second olefin monomer units in a tapered block copolymer structure can vary widely depending on the particular physical and behavior properties desired. Generally, each monomer unit can be about 5-95 mole percent of the tapered block copolymer structure based on the total moles of both monomers units present in the tapered block copolymer structure. Preferably, each monomer unit is about 20-80 mole percent of the tapered block copolymer structure, more preferably, about 30-70 mole percent, more preferably still, about 40-60 mole percent, and even more preferably, about 45-55 mole percent. In preferred embodiments, one monomer unit is about 20 mole percent or less, and the other monomer unit is about 80 mole percent or greater.

The present invention may be better understood by referring to the accompanying examples, which are intended for illustration purposes only and should not in any sense be construed as limiting the scope of the invention as defined in the claims appended hereto.

Example 1

Figure 2:
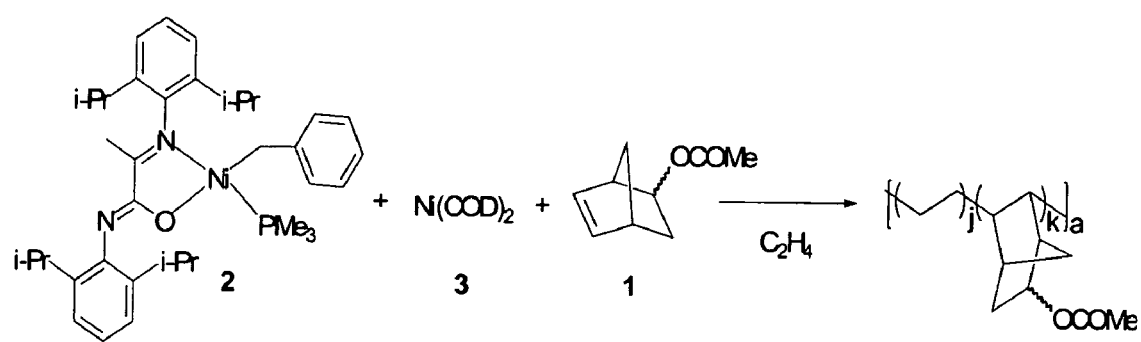
FIG. 2 shows a polymerization reaction of two olefin monomers in the presence a catalyst system.

Tapered block copolymers were prepared and characterized. All manipulations were performed under an inert atmosphere using standard glove box and Schlenk techniques. All reagents were used as received from Aldrich (Sigma-Aldrich Corp., St. Louis, Mo.), unless otherwise specified. A Parr 100 mL metal reactor (model 4565) was used for all polymerizations. Ethylene (research grade, 99.99% pure) was purchased from Matheson Tri-Gas (Parsippany, N.J.) and was purified by passage through high pressure, stainless steel, oxygen and moisture traps (Matheson models OT-4-SS and MT-4-SS respectively). Toluene, THF, hexane and pentane were distilled from benzophenone ketyl. Toluene for polymerization runs was distilled from sodium/potassium alloy. 5-Norbornen-2-yl acetate (compound 1 of FIG. 2) was from Aldrich and was vacuum distilled before use. [N-(2,6-diisopropylphenyl)-2-(2,6-diisopropylphenylimino)propanamide]Ni(CH$_2$Ph)(PMe$_3$) (compound 2 of FIG. 2) and Ni(COD)$_2$ were synthesized as reported previously and purified by re-crystallization (33).

A typical copolymerization was performed as follows. A metal reactor was loaded inside a glove box with compound 2 (20 μmol), Ni(COD)$_2$ (50 μmol), 5-norbornen-2-yl acetate (4.50 mmol), and toluene such that the final volume of this solution was 30.0 mL. The metal reactor was sealed inside the glove box and was attached to a vacuum/nitrogen line manifold. Ethylene was fed continuously into the reactor at 200 psi and the pressurized reaction mixture was stirred at 20° C. The molar feed ratio of the olefins can be varied from 0.01 to 0.99. Ethylene was vented after a specific reaction time and acetone was added to quench the polymerization. The precipitated polymer was collected by filtration and dried under high vacuum overnight.

NMR spectra were obtained using a Varian Unity 400 or 500 spectrometers. $^1$H NMR spectra of the polymers were obtained in mixed solvent ($C_6D_6$/1,2,4-trichlorobenzene 1:4 ratio in volume) at 115° C. Gel Permeation Chromatography (GPC) measurements were performed on a Polymer Labs High Temperature GPC system (Model PL-220).

Transmission electron microscopy studies were performed on annealed copolymer films. Bulk polymer samples were annealed in high vacuum for 1 day at 200° C., followed by 3 days at 160° C. to allow the microphase to equilibrate, followed by a rapid quench in <1 min to liquid nitrogen temperatures. First the sample surface was cut at −190° C. to make a smooth surface for the stain to penetrate into the sample. The sample was then stained in the vapor of a 0.5% $RuO_4$ stabilized aqueous solution (Electron Microscopy Science) for a period of five days. Sections 80 nm thick of the stained polymer were then cut using a Leica Ultracut UCT ultramicrotome with a diamond knife at room temperature. TEM images of the stained samples were obtained using a FEI Tecnai G2 Sphera TEM operating at 200 kV. The observed contrast is due to the local oxidation of the amorphous phase of the block copolymer by Ru.

Example 2

In this example, a tapered block copolymer prepared from ethylene and the polar comonomer 5-norbornen-2-yl acetate (compound 1 of FIG. 2) is synthesized. The catalyst system, generated with L($^i$Pr$_2$)Ni($\eta^1$-CH$_2$Ph)(PMe$_3$) (compound 2 of FIG. 2) [L=N-(2,6-diisopropylphenyl)-2-(2,6-diisopropylphenyl-imino)propanamide] and about 2.5 equivalents Ni(COD)$_2$ (bis(1,5-cyclooctadiene)nickel), shows quasi-living copolymerization characteristics and can be used for the preparation of block copolymers containing segments of random sequences of ethylene and compound 1 with different molar compositions, as shown in the previously referred to U.S. application Ser. Nos. 10/377,491 now U.S. Pat. No. 7,259,214 and 10/378,957 by one of the inventors. A batch reaction is used, whereby the ethylene pressure is kept substantially constant and the concentration of compound 1 is allowed to deplete by its incorporation into the polymer structure, thus resulting in a tapered structure. Under these circumstances, the growing chain is rich in compound 1 at the beginning of the reaction. As the reaction proceeds, the concentration of compound 1 is reduced, leading to an increase in the fraction of ethylene incorporated into the chain. The final structure of the polymer is a polar amorphous chain end (rich in compound 1) on one terminus and a semi-crystalline, non-polar chain (primarily polyethylene) on the other end. To carry out the polymerization, a reactor is initially filled with a solution of the catalyst and compound 1. Polymerization takes place when ethylene is added and is terminated after a chosen reaction time.

Example 3

A set of polymerizations was performed as in Example 2 to gain insight into the polymer composition and structure as a function of reaction time (Table 1). For these polymerizations, the ethylene pressure was kept substantially constant at about 200 psi, toluene was used as the solvent, and the initial concentrations of compounds 1, 2 and Ni(COD)$_2$ were about 0.15 M, 0.67 mM and 1.67 mM, respectively. The isolated polymers were characterized by $^1$H NMR spectroscopy to evaluate the overall content of compound 1 and ethylene incorporated. Molecular weight determinations were done by gel permeation chromatography against linear polyethylene standards. Table 1 shows that there is a progressive increase in average molecular weight with reaction time, even up to 120 minutes. This increase is consistent with the quasi-living characteristics of the polymerization reaction. Deviations from linearity are due to reaction variables such as the changing comonomer composition, which affects polymerization rates, and the precipitation of the polymer at reaction times longer than 45 minutes. Copolymers with larger fractions of monomer units derived from compound 1 are soluble in toluene, whereas the semi-crystalline ethylene-rich copolymer segments formed at later stages of the reaction have poor solubility. The precipitation of the polymer chains at about 45 minutes is accompanied by an increase of polydispersity at this point, as seen by comparing entries 8 and 9. Each entry shows the average from three polymerizations, except for entries 11 and 12.

TABLE 1

Polymer profile as a function of reaction time.

| Entry | Reaction Time | Mn | PDI | Mol % Nor. Ac. |
|---|---|---|---|---|
| 1 | 4 | 10 ± 1 | 1.3 | 18 ± 1 |
| 2 | 5 | 18 ± 1 | 1.2 | 18 ± 1 |
| 3 | 8 | 27 ± 2 | 1.2 | 14 ± 1 |
| 4 | 10 | 28 ± 1 | 1.3 | 14 ± 1 |
| 5 | 20 | 37 ± 3 | 1.4 | 12 ± 1 |
| 6 | 25 | 47 ± 3 | 1.4 | 11 ± 1 |
| 7 | 35 | 55 ± 5 | 1.4 | 10 ± 1 |
| 8 | 45 | 63 ± 3 | 1.3 | 9 ± 1 |
| 9 | 60 | 94 ± 10 | 1.5 | 6 ± 1 |
| 10 | 80 | 109 ± 1 | 1.5 | 6 ± 1 |
| 11 | 100 | 136 | 1.6 | 5 ± 1 |
| 12 | 120 | 170 | 1.5 | 4 ± 1 |

Table 1 also shows that the overall fraction of compound 1 in the product decreases with longer reaction times. The polymer chains thus have the highest fraction of the polar component at the beginning, when [compound 1] is at its maximum. To better understand this polymerization system, we synthesized two new libraries of tapered copolymers at [compound 1]=0.075 M and 0.225 M. These data can be used in conjunction with the results in Table 1 to determine upper and lower limits of compound 1 content in the copolymer at various reaction times and ratios of compound 1 to $C_2H_4$. Performing these copolymerizations at [compound 1]>0.225 M leads low polymerization rates, probably due to coordination of comonomer functionality to the active site. When [compound 1]<0.075 M, polymer precipitation occurs at early reaction times. Varying [compound 1]$_o$ causes, overall, little change in the profile of molecular weight growth with time.

Example 4

Figure 3:
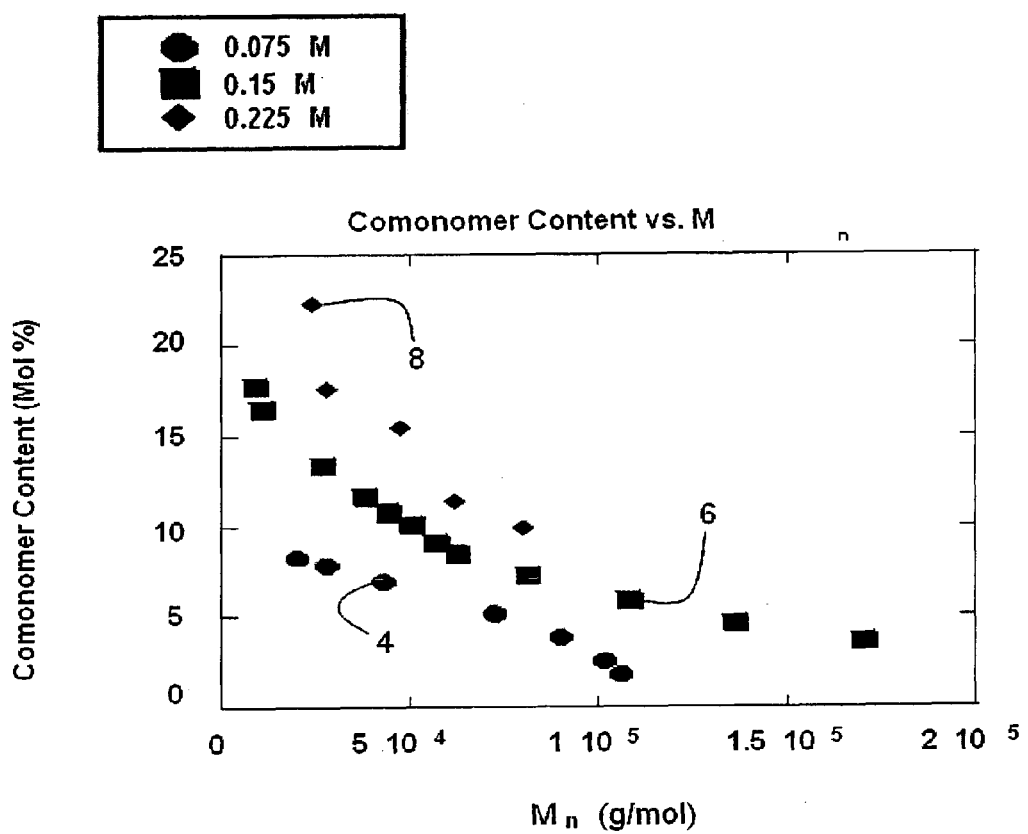
FIG. 3 is a graph of monomer content as a function of increasing polymer molecular weight.

FIG. 3 shows the decrease of comonomer content in the polymer chain with increasing molecular weight. Copolymers were prepared as in Example 3. Since compound 1 is consumed solely through incorporation into the polymer, the residual comonomer concentration can be calculated from the structural composition by multiplying the weight percent of compound 1 in the chain by the polymer mass (Equation 1).

$$1_c - W_1 * M = 1x \quad (1)$$

In Equation 1, $1_o$ is the initial comonomer mass, $W_1$ is the weight fraction of compound 1 in the product, $M_p$ is the mass of isolated polymer and $1_x$ is the mass of compound 1 remaining in solution. After 60 minutes, (Table 1, entry 9) greater than 99% of the original compound 1 in the reactor has been incorporated into the growing chains. Extension of the polymer chain from this point onward takes place predominantly by the formation of polyethylene. Varying $[1]_o$ causes large changes in the comonomer content of the copolymers as shown in FIG. 3, which provides curves depicting comonomer content as a function of polymer molecular weight for a sample having an initial comonomer concentration of 0.075 M (curve 4), a sample having an initial comonomer concentration of 0.15 M (curve 6), and a sample having an initial comonomer concentration of 0.225 M (curve 8). As expected, the lower $[1]_o$ causes lower overall comonomer contents. The tapering trends are similar with the exception of the lowest initial comonomer concentration, which has a peculiar tapering profile. The content of 5-norbornen-2-yl acetate decreases nearly linearly with increasing molecular weight, until a certain point where the content decreases rapidly. This point likely corresponds to the precipitation of the polymer chains from the reaction solution.

Example 5

It would be useful to calculate the probability of compound 1 insertion as a function of chain length for maximum control of molecular structure. Optimum results would require continuous monitoring as a function of reaction time of both molecular weight and comonomer composition. The data in Table 1 may be used to estimate the probability of insertion. Consider for example two consecutive entries (a and b) in Table 1. The probability of compound 1 insertion in the interval between the two entries ($P_{a \to b}$) can be estimated by $$P_{a \to b} = \frac{(F_{1b} \times X_{nb}) - (F_{1a} \times X_{na})}{(X_{nb} - X_{na})}$$

where: $F_{1b}$, $X_{nb}$, $F_{1a}$ and $X_{na}$ are the fraction of compound 1 in entry b, the average degree of polymerization in entry b, the fraction of compound 1 in entry a and the average degree of polymerization in entry a, respectively. The $X_n$ for each entry is obtained by dividing the number average molecular weight ($M_n$) by the average mass of the monomer units ($M_{ave}$). We use $M_1/F_1 + M_E/F_E$ to obtain $M_{ave}$, where $M_1$, $F_1$, $M_E$ and $F_E$ are the molecular weight of compound 1, the fraction of compound 1 in the chain, the molecular weight of ethylene and the fraction of ethylene in the chain, respectively. The average number of compound 1 for a given $X_n$ is provided by $F_1 \times X_n$. The $M_n$ determined by GPC is proportional to the hydrodynamic volume of the polymer, which is influenced by the comonomer fractions, and this is a source of error. These data are plotted in FIG. 4, which depicts the probability of 5-norbornen-2-yl acetate incorporation as a function of degree of polymerization for a 0.075 M sample (curve 10), a 0.125 M sample (curve 12) and a 0.225 M sample (curve 14).

Figure 4:
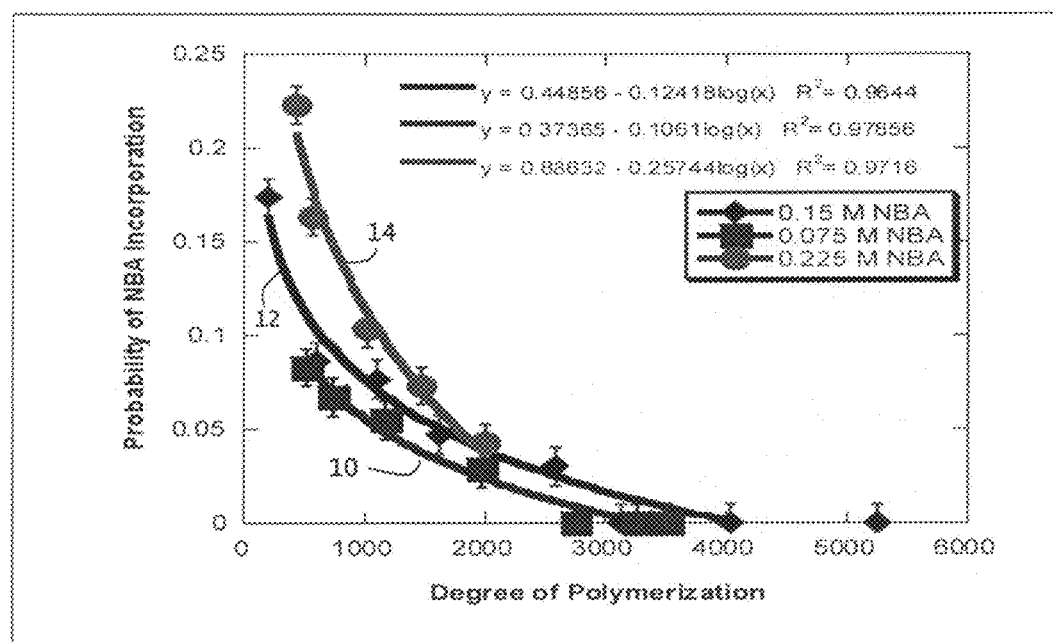
FIG. 4 is a graph that depicts the probability of 5-norbornen-2-yl acetate incorporation as a function of degree of polymerization.

From FIG. 4 one can see the result of changing $[1]_o$ on the tapering profile. These data are well fit with logarithmic decay functions. Higher $[1]_o$ causes steeper tapering profiles while lowering $[1]_o$ causes a shallower tapering profile. We suspect that polymers with shallower tapering profiles (lower $[1]_o$) should have a lower driving force for microphase separation due to the longer and more gradual tapered region. This has the effect of shortening the enriched chain ends that are the source of the microphase separation. Despite the different tapering profiles $P_1$ decreases to zero for $[1]_o$=0.075, 0.15 M. $P_1$ was not seen to go to zero in the case of $[1]_o$=0.225 M, due to limited maximum reaction times due to the onset of gelation. Comparing the logarithmic prefactors of the logarithmic data shows the quantitative increase in tapering rate with an increase in $[1]_o$. This tapering behavior cannot be directly correlated to the copolymerization reactivity ratios, due to the differing solubilities of the polymer chains and the differing polarity of the reaction media at these three different monomer concentrations.

Figure 5A:
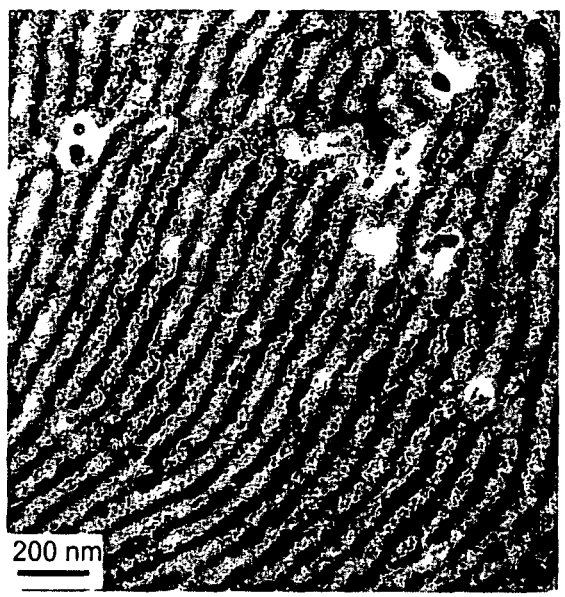
FIG. 5A is a transmission electron micrograph of lamellar morphology of a tapered block copolymer.
Figure 5B:
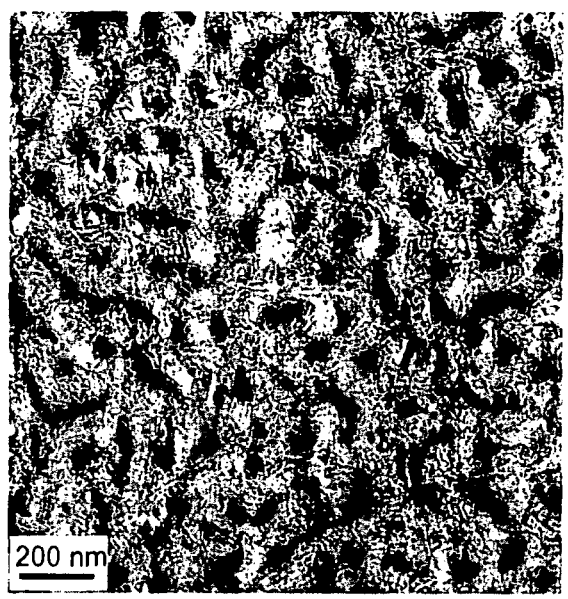
FIG. 5B is a transmission electron micrograph of cylindrical morphology of a tapered block copolymer.

At reaction times greater than 45 minutes the beginning and end portions of the polymer chain are sufficiently different in molecular structure to force the formation of microphase separated structures. These gradient copolymers show evidence of microphase separated lamellar (Table 1, entries 8 and 9) (FIG. 5A) and cylindrical morphologies (Table 1, entry 12) (FIG. 5B). FIG. 5A is a transmission electron micrograph of Table 1, Entry 8. The morphology is lamellar, where semicrystalline polyethylene layers (light) alternate with amorphous copolymer layers. FIG. 5B is a transmission electron micrograph of Table 1, Entry 12. The morphology a poorly organized hexagonal phase, where amorphous copolymer cylinders are embedded in a semicrystalline polyethylene matrix (light). Polyethylene crystals can also be observed in the matrix. The dark spots are caused by stain contamination by $RuO_4$.

The lamellar structure formed is not surprising, since the lamellar phase is the stable equilibrium solid state structure for the majority of gradient copolymer compositions, including asymmetric gradient copolymers (9). The critical point for the order/disorder transition increases with an increasing composition gradient and increasing normalized chain length of the composition gradient. Therefore, while $(\chi N)c$=10.495 for block copolymers, it approaches 29.25 for a fully tapered linear gradient copolymer (6). This may explain the relatively weak ordering seen in these polymer samples. Entry 8 shows a lamellar morphology depicting alternate sheets of comonomer rich and comonomer poor (pure polyethylene) regions of the tapered copolymer. The composition gradient ensures that the two regions are almost symmetric, hence the lamellar morphology. As the reaction time and hence, $M_n$ is increased, the morphology changes from alternate lamellar sheets to a poorly organized hexagonal phase (Table 1, entry 12, FIG. 5B). The copolymer is highly asymmetric where the longer, comonomer deficient polyethylene block forms the matrix and cylinders of the comonomer rich block form the minority phase. A low comonomer content and a high overall $M_n$ weakens the driving force towards segregation which, in turn, prevents the system from arranging into an ordered array of hexagonally packed cylinders. Hence the phase is poorly organized. The appearance of polyethylene crystals in the matrix (FIG. 5B) is also due to a high overall $M_n$ which results in substantial crystallization in the longer, comonomer deficient polyethylene block.

Example 6

Since the tapered block materials prepared according to Example 3 contain amorphous segments rich in compound 1 and semi-crystalline segments rich in ethylene, their mechanical behavior was investigated. These tapered block materials have interesting mechanical properties that are chain length dependent (FIG. 6A). Dynamic mechanical analysis was performed using a TA Instruments 2980 DMA. Tension film geometry was used to investigate the storage modulus G' as a function of temperature and to detect the glass transition of the samples by measuring tan δ. FIG. 6 shows the results of dynamic mechanical testing results on tapered copolymers, showing the results of the storage modulus in FIG. 6A and tan δ in FIG. 6B. In FIG. 6A, curve 16 corresponds to Table 1, entry 12 (sample R8), curve 18 corresponds to Table 1, entry 11 (sample R6), curve 20 corresponds to Table 1, entry 7 (sample R4), and curve 22 corresponds to Table 1, entry 4 (sample R1). In FIG. 6B, curve 24 corresponds to sample R8, curve 26 to sample R6, curve 28 to sample R4, and curve 30 to sample R1.

As shown by the results in FIG. 6, the curves of storage moduli shifted upwards (to higher moduli) by increasing the ethylene content in tapered copolymers. This is significant in that it shows that the storage modulus increases with an increase in molecular weight. This is due to the fact that increasing chain length increases ethylene content due to tapering. Furthermore, these longer tapered chains are more likely to contain longer segments of pure polyethylene. This leads to a larger degree of higher crystallinity segments, giving the material more strength and higher modulus. FIG. 6B shows tan δ which possess maxima at an almost identical temperature (~20° C.), meaning the glass transition temperature stays constant. This finding is significant because it shows that the amorphous segments of these materials are not changing significantly after ten minutes of reaction time, and that all changes in polymeric structure are occurring in the semi-crystalline ethylene-rich segment. These results are significant because the molecular weight grows nearly linearly with reaction time, so the storage modulus (and thus mechanical properties) can be altered through control of polymerization time.

Example 7

Figure 7:
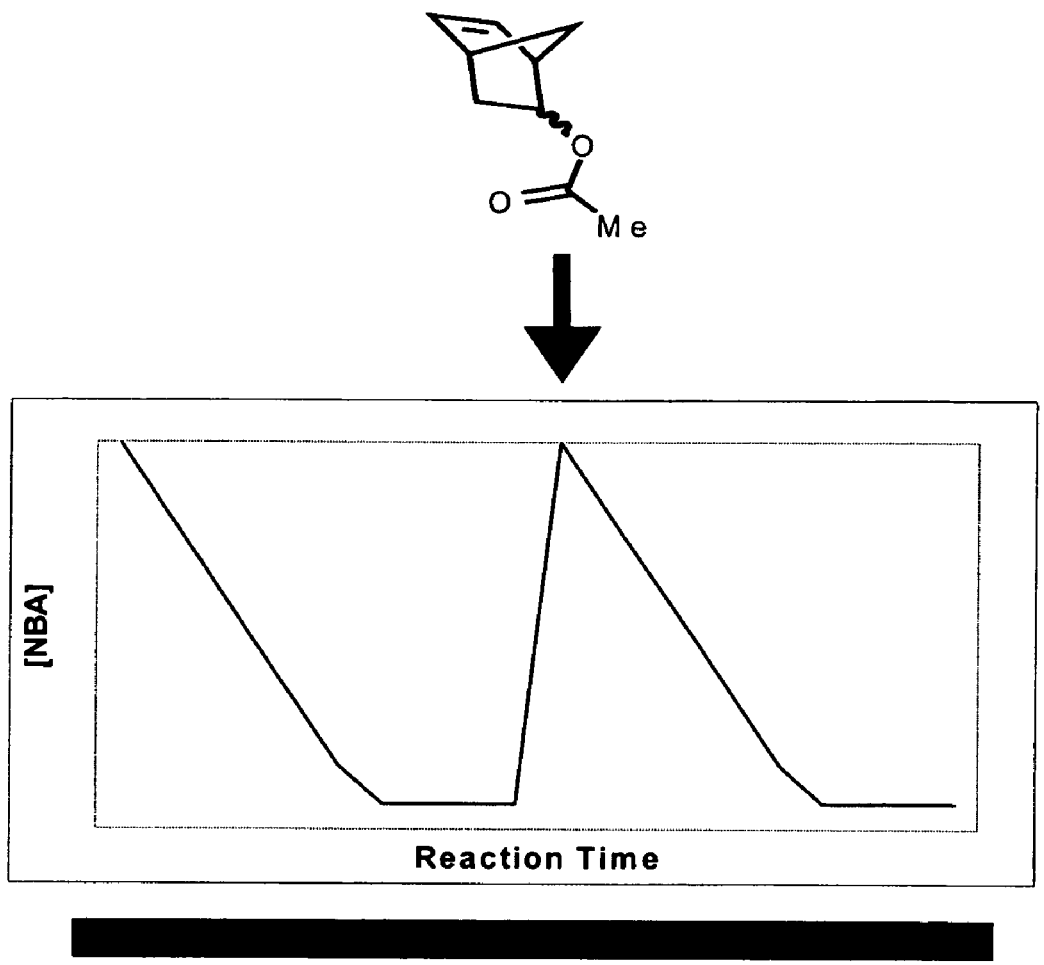
FIG. 7 is a schematic drawing of a method of synthesizing a tapered tetrablock polymer.

Multiblock copolymers, made up of sections where each section has a tapered block copolymer organization, were synthesized. In particular, tetrablock copolymers made up of two tapered diblock copolymers covalently connected in an alternating fashion to yield a tapered tetrablock copolymer, were prepared. Tetrablock copolymers of this type have good mechanical properties since they order into amorphous (5-norbornen-2-yl acetate rich) and semi-crystalline (polyethylene-rich) domains. FIG. 7 shows schematically the method of synthesizing a tapered tetrablock copolymer. The polymerization was carried out at the beginning like a typical tapered copolymerization such as in Example 2. After a specified time (T1), a second batch of comonomer solution was added to begin the synthesis of a second norbornene rich block. The polymerization was continued for a time (T2) after the addition of the second batch of comonomer. The amount of norbornene to be added at T2 was calculated from the consumption of 5-norbornen-2-yl acetate in the first tapered diblock segment.

Example 8

A series of five tapered tetrablock copolymers were prepared as in Example 7. Table 2 lists the polymer profile as a function of time for the copolymers. The increase in molecular weight with the increase in total reaction time, coupled with the narrow molecular weight distributions of these materials, suggest that this synthetic method is a living process. Comparison of entries 4 and 5 shows that the reproducibility of this system is very good, despite the complex nature of the synthesis. Table 2 also shows the decrease of content of 5-norbornen-2-yl acetate in the copolymer with increasing reaction time. Table 2 shows the thermal properties of the tapered tetrablock copolymers. By comparing entries 1 and 2 to entries 3-5 one can see that the melting temperature of the tetrablocks increase with increasing reaction time. This is due to the fact that these segments are tapered so the chain ends become increasingly enriched with ethylene the longer the polymerization continues. Therefore, polymers with longer T1 and T2 have longer and more ethylene enriched segment ends leading to higher melting material. The fact that a single melting peak is observed is proof that the two tapered diblock segments, from T1 and from T2, are very similar. One can also see that the glass transition temperatures are more or less independent of reaction times. This is due to the fact that the amorphous segment is identical among all these tapered tetrablock materials, while only the ethylene-like segment is being altered.

TABLE 2

Tapered tetrablock copolymers of ethylene and 5-norbornen-2-yl acetate (NBA)

| Entry | T1 (min.) | T2 (min.) | Mn (kg/mol) | PDI | Mol % NBA | Tm (° C.) |
|---|---|---|---|---|---|---|
| 1 | 30 | 30 | 95 | 1.4 | 14 ± 1 | 63.9 |
| 2 | 45 | 45 | 156 | 1.3 | 9 ± 1 | 64.8 |
| 3 | 55 | 55 | 168 | 1.6 | 6 ± 1 | 99.9 |
| 4 | 60 | 60 | 181 | 1.4 | 7 ± 1 | 98.4 |
| 5 | 60 | 60 | 202 | 1.4 | 8 ± 1 | 96.8 |

Reaction conditions: $P_{C2H4}$ = 200 psi, [2] = 0.67 mM, Ni(COD)$_2$ = 1.67 mM.

Figure 8A:
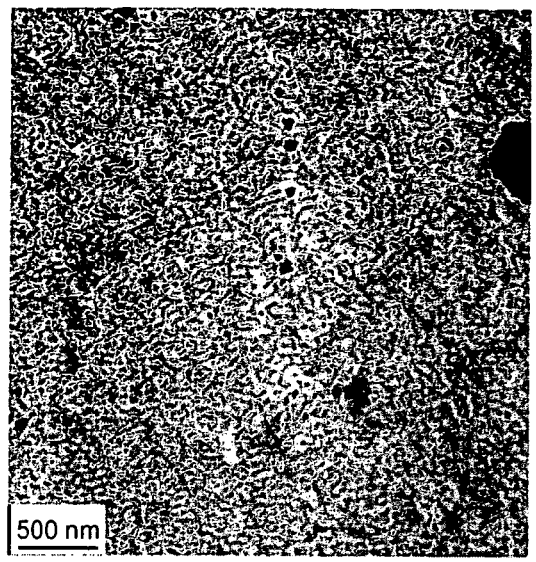
FIG. 8A is a low resolution transmission electron micrograph of the morphology of a tapered tetrablock copolymer.
Figure 8B:
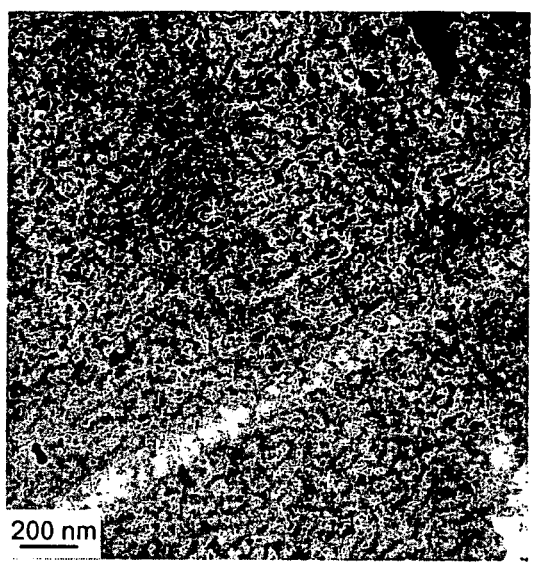
FIG. 8B is a high resolution transmission electron micrograph of the morphology of a tapered tetrablock copolymer.

By comparing the data from the tapered diblock copolymers in Table 1 to their respective matched tapered tetrablock copolymer in Table 2, it can be seen that these materials are similar to each other in all criteria except chain length. For instance, if entry 6 from Table 1 is compared with entry 1 from Table 2, it can be seen that the number average molecular weight from the tetrablock is nearly double that of the respective tapered diblock. This supports the assertion that the tetrablock copolymers are composed of two identical tapered diblocks covalently bound together. Furthermore, we have observed a cylindrical microphase separated structure through transmission electron microscopy. This is demonstrated in FIG. 8, which shows transmission electron micrograph of a tapered tetrablock copolymer with Mn=181 kg/mol (Table 2, entry 4), at two different resolutions. As shown in FIG. 8A and at higher resolution in FIG. 8B, the morphology is cylindrical, where amorphous copolymer cylinders are embedded in a semi-crystalline polyethylene matrix. This result agrees well with the structure previously observed for the related tapered diblock copolymer Table 1, entry 9.

Example 9

Figure 9:
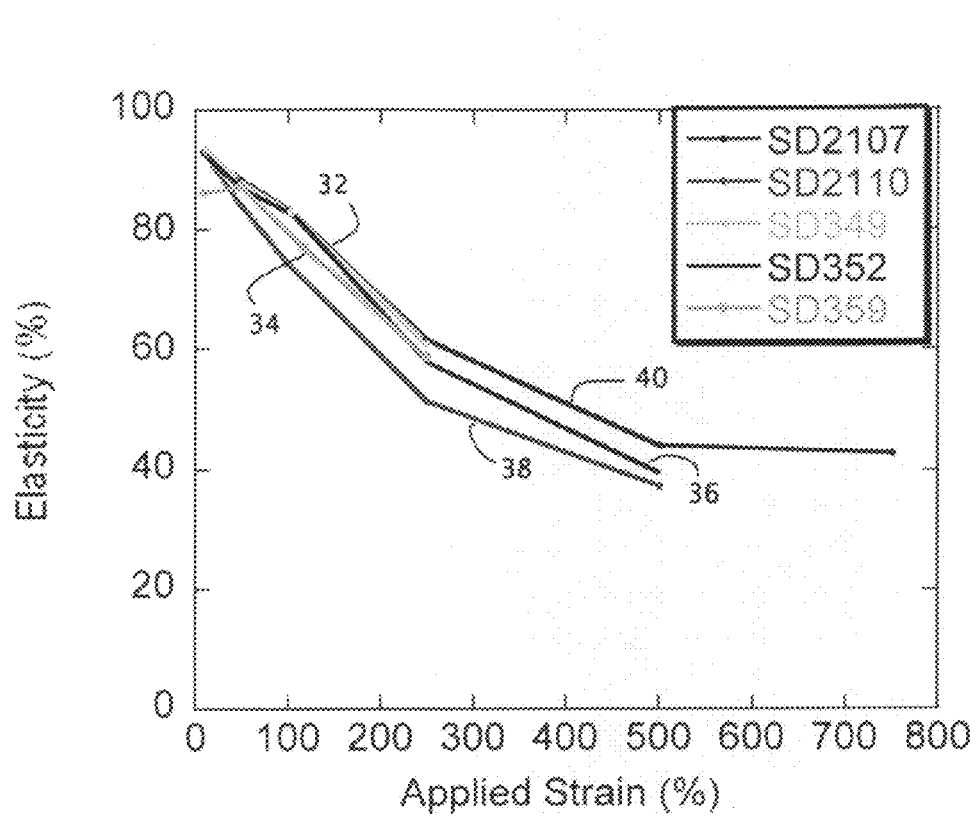
FIG. 9 is a graph of elasticity as a function of applied strain of various tapered block copolymers tested at 20° C.

The mechanical behavior of tetrablock copolymers was studied. The tetrablock copolymers were prepared as in Example 7. FIG. 9 shows the elastic recovery of these copolymers. All of these materials were able to stretch to approximately 300% strain with maintaining 40-50% elastic recovery. Although this elastic recovery is substantially lower than commercial materials, it is impressive considering that the matrix of these tetrablocks is polyethylene. The results are unexpected because traditional elastomers generally contain the elastic portion in the matrix, not in the domains. The maximum extension of the tetrablock copolymers seems to increase with increasing molecular weight. Comparing the strain curves of Table 2, entries 1 and 2 (curves 32 and 34 of FIG. 9, respectively) to those of Table 2, entries 3-5 (curves 36, 38 and 40 of FIG. 9, respectively) one can clearly see this trend. The lower molecular weight samples have a maximum extension near 300% while the higher molecular weight samples have extensions greater than 500%, with an extension of nearly 800% for entry 5 (curve 40). Despite their differences in maximum strain at break all samples seem to possess similar elasticity behavior.

Figure 10:
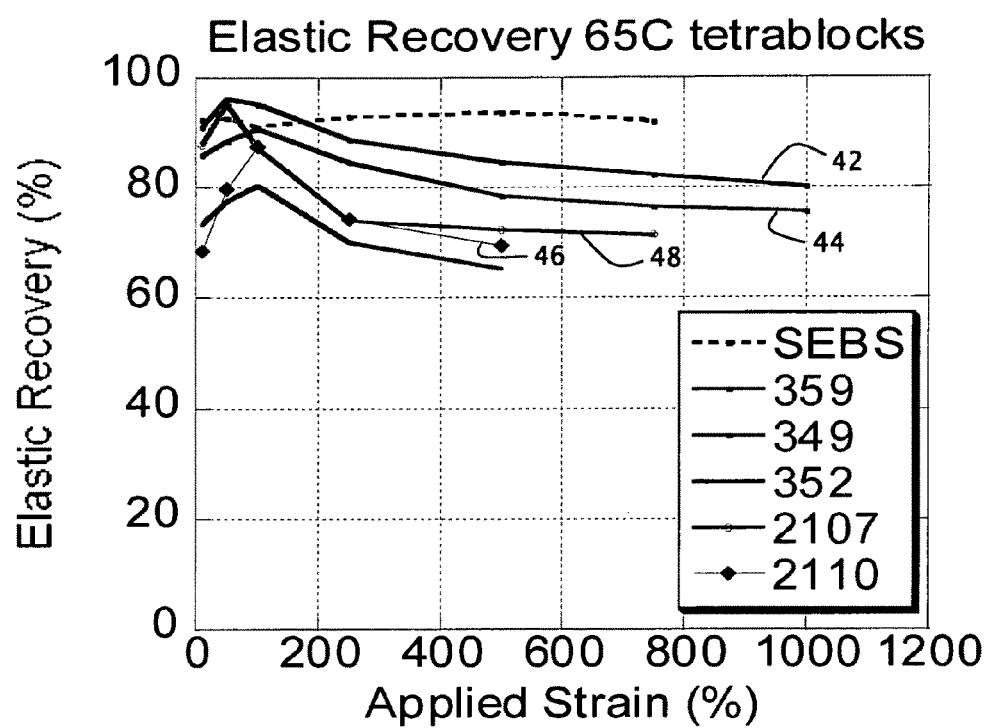
FIG. 10 is a graph of elastic recovery as a function of applied strain of various tapered block copolymers tested at 65° C.

If these materials are tested at elevated temperatures (~65° C.) superior mechanical properties are seen, relative to ambient temperature testing (FIG. 9). This is likely due to the relatively high Tg (~20° C.) of the amorphous segment of these tapered tetrablock copolymers. Therefore, it is reasonable that testing these materials high above their Tg would improve the elasticity. A particularly impressive example is Table 2, entry 2 (FIG. 9, curve 34), which at 20° C. has a maximum strain of less than 300% with an elastic recovery of 60% at maximum strain; at 65° C. the same material shows a maximum extension of 1000% with an elastic recovery of 80% at maximum strain (FIG. 10, curve 42). A similar improvement in mechanical properties can be seen in Table 2, entry 1 (FIG. 9, curve 34, FIG. 10, curve 44). Interestingly, the highest molecular weight materials (Table 2, entries 4 and 5, curves 38 and 40, respectively, in FIG. 9 and curves 46 and 48, respectively, in FIG. 10) showed an increase in elastic recovery at high temperature testing but no improvement in maximum strain. The mechanical properties of these materials compare well with those of SEBS, a common thermoplastic elastomer. These materials have the advantage of containing functionality, making them more amenable to adhesive applications.

Example 10

Figure 11:
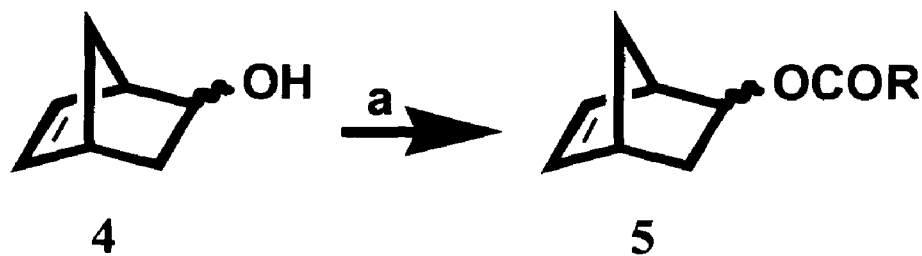
FIG. 11 shows a reaction for the synthesis of norbornene derivatives.

Tapered tetrablock polymers with amorphous segments possessing lower Tgs were prepared. It is known that the introduction of pendant alkyl chains in norbornene monomers causes a decrease in the Tg of these materials. Therefore, several derivatives of norbornene acetate having longer pendant alkyl chains were synthesized, as shown in FIG. 11.

Reagents for the synthesis of 5-norbornen-2-yl valerate, 5-norbornen-2-yl propionate, and 5-norbornen-2-yl butyrate included 5-norbornen-2-ol (99%, mixture of endo:exo 1.00: 0.34), valeric anhydride (97%), propionic anyydride (99+%), butyric anyydride, (99%) and 4-(N,N-dimethylamino)pyridine (DMAP; 99%). These reagents were used as received from Aldrich. Dichloromethane (ACS Grade) was from EMD and was stored over four angstrom molecular sieves. Pyridine (ACS Grade) was from EM Science and was stored over KOH pellets.

Example 11

The synthesis of 5-norbornen-2-yl valerate was performed as follows. In the following order were added 5-norbornen-2-ol (4.41 g, 0.0400 mol), valeric anhydride (11.18 g, 0.0600 mol), pyridine (9.49 g, 0.1200 mol), and 4-(N,N-dimethylamino)pyridine (0.24 g, 0.0020 mol) in 100 mL dichloromethane. TLC plate ($CH_2Cl_2$) performed after 16 hours reaction time showed that conversion was complete (no unreacted 5-norbornen-2-ol and a spot of the 5-norbornen-2-yl valerate at $R_f$=0.55). Methanol (anhydrous) was then added (10 mL) in order to quench the excess valeric anhydride. The reaction solution was purified by extraction (3×50 mL 2M HCl, 3×50 mL sat. $NaHCO_3$ soln., 2×50 mL DI $H_2O$) and then dried overnight with magnesium sulfate. The solvent was then removed by rotary evaporation to isolate the crude product. The crude liquid was then distilled under reduced pressure to yield a clear, colorless, liquid (b.p. 98-101° C., 12.6 mm Hg). According to the $^1$H-NMR spectrum the distilled liquid was a very pure mixture of endo and exo isomers of 5-norbornen-2-yl valerate in a molar ratio of 1.00:0.34 endo: exo (the exact ratio of isomers in the starting 5-norbornen-2-ol). This final pure product (yield 6.80 g, 87.5% yield) was degassed and used directly for polymerizations.

Example 12

The synthesis of 5-norbornen-2-yl butyrate was performed as follows. In the following order were added 5-norbornen-2-ol (4.41 g, 0.0400 mol), butyric anhydride (9.49 g, 0.0600 mol), pyridine (9.49 g, 0.1200 mol), and 4-(N,N-dimethylamino)pyridine (0.24 g, 0.0020 mol) in 100 mL dichloromethane. TLC plate ($CH_2Cl_2$) performed after 16 hours reaction time showed that conversion was complete (no unreacted 5-norbornen-2-ol and a spot of the 5-norbornen-2-yl butyrate). Methanol (anhydrous) was then added (10 mL) in order to quench the excess valeric anhydride. The reaction solution was purified by extraction (3×50 mL 2M HCl, 3×50 mL sat. $NaHCO_3$ soln., 2×50 mL DI $H_2O$) and then dried overnight with magnesium sulfate. The solvent was then removed by rotary evaporation to isolate the crude product. The crude liquid was then distilled under reduced pressure to yield a clear, colorless, liquid (b.p. 90-91° C., 13.0 mm Hg). According to the $^1$H-NMR spectrum the distilled liquid was a very pure mixture of endo and exo isomers of 5-norbornen-2-yl butyrate in a molar ratio of 1.00:0.34 endo:exo (the exact ratio of isomers in the starting 5-norbornen-2-ol). This final pure product (yield 6.11 g, 84.7% yield) was degassed and used directly for polymerizations.

Example 13

The synthesis of 5-norbornen-2-yl propionate was performed as follows. In the following order were added 5-norbornen-2-ol (4.41 g, 0.0400 mol), propionic anhydride (7.81 g, 0.0600 mol), pyridine (9.49 g, 0.1200 mol), and 4-(N,N-dimethylamino)pyridine (0.24 g, 0.0020 mol) in 100 mL dichloromethane. TLC plate ($CH_2Cl_2$) performed after 16 hours reaction time showed that conversion was complete (no unreacted 5-norbornen-2-ol and a spot of the 5-norbornen-2-yl butyrate at $R_f$=0.57). Methanol (anhydrous) was then added (10 mL) in order to quench the excess valeric anhydride. The reaction solution was purified by extraction (3×50 mL 2M HCl, 3×50 mL sat. $NaHCO_3$ soln., 2×50 mL DI $H_2O$) and then dried overnight with magnesium sulfate. The solvent was then removed by rotary evaporation to isolate the crude product. The crude liquid was then distilled under reduced pressure to yield a clear, colorless, liquid (b.p. 98-101° C., 18.0 mm Hg). According to the $^1$H-NMR spectrum the distilled liquid was a very pure mixture of endo and exo isomers of 5-norbornen-2-yl propionate in a molar ratio of 1.00:0.34 endo:exo (the exact ratio of isomers in the starting 5-norbornen-2-ol). This final pure product (yield 5.44 g, 81.8% yield) was degassed and used directly for polymerizations.

Example 14

Preliminarily, we synthesized tapered diblock copolymers with various norbornene acetate derivatives as models for the tapered tetrablock polymers. Table 3 shows that an increased length of the alkyl chain on the acyl unit leads to a decrease of the Tg of the copolymer, as expected. Particularly, by lengthening the alkyl side chain on the acyl derivative the glass transition temperature can be varied from 20° C. (methyl group) to as low as 2° C. for the butyl side chain. The longest alkyl derivative, norbornene valerate, was chosen for synthesis of tetrablock copolymers.

TABLE 3

Tapered Block Copolymers of Norbornene Acetate Derivatives (NBDs)

| Entry | R = | $M_n$ (kg/mol) | Mol % NBD | Tg (° C.) |
|---|---|---|---|---|
| 1 | Me | 63 ± 3 | 10 ± 1 | 20° C. |
| 2 | Et | 23 ± 2 | 13 ± 1 | 12° C. |
| 3 | Pr | 71 | 12 ± 1 | 8° C. |
| 4 | n-Bu | 53 ± 2 | 13 ± 2 | 2° C. |

Reaction conditions: $P_{C2H4}$ = 200 psi, reaction time = 45 minutes, [catalyst] = 0.67 mM, Ni(COD)$_2$ = 1.67 mM, [NBD] = 0.15 M.
Tg is by DMA in heating cycle.

To probe the reactivity and behavior of this system, a series of tapered diblock copolymers of ethylene and norbornene valerate were prepared. The copolymers were synthesized as in Example 2, with norbornene valerate instead of norbornene acetate. A variety of chain lengths were synthesized by varying the reaction time of the tapered copolymerization, and the results of these reactions are shown in Table 4. From Table 4 one can see that the molecular weight of the tapered block copolymer containing norbornene valerate increases with increased reaction time, but that these molecular weights are lower than those seen for tapered block copolymers containing norbornene acetate (Table 1). Further, the rate of molecular weight growth with time is also lower relative to that seen in 5-norbornen-2-yl acetate tapered copolymerizations. This is likely due to increased steric requirements of the longer alkyl chain, which acts to slow the rate of copolymerization. Table 4 shows that the melting temperature of the ethylene rich segment of the tapered block copolymers increases with increasing reaction time. This is due to the fact that increasing the reaction time after most of the norbornene valerate has been consumed leads only to the lengthening of the ethylene-rich segment. The longer this segment grows, the higher the crystallinity, and thus, the higher the observed melting temperature.

TABLE 4

Tapered Block Copolymers of norbornene valerate (NBV)

| | Reaction Time (min.) | Mn (kg/mol) | PDI | NBV Content (mol %) | Tg (° C.) | Tm (° C.) |
|---|---|---|---|---|---|---|
| 1 | 30 | 46 ± 3 | 1.3 | 14 ± 1 | 2 | 67 |
| 2 | 45 | 55 ± 3 | 1.4 | 13 ± 1 | 2 | 71 |
| 3 | 60 | 65 ± 4 | 1.4 | 10 ± 1 | 2 | 101 |

Reaction conditions: $P_{C2H4}$ = 200 psi, reaction time = 45 minutes, [catalyst] = 0.67 mM, Ni(COD)$_2$ = 1.67 mM, [norbornene valerate] = 0.15 M.

Example 15

Figure 12:
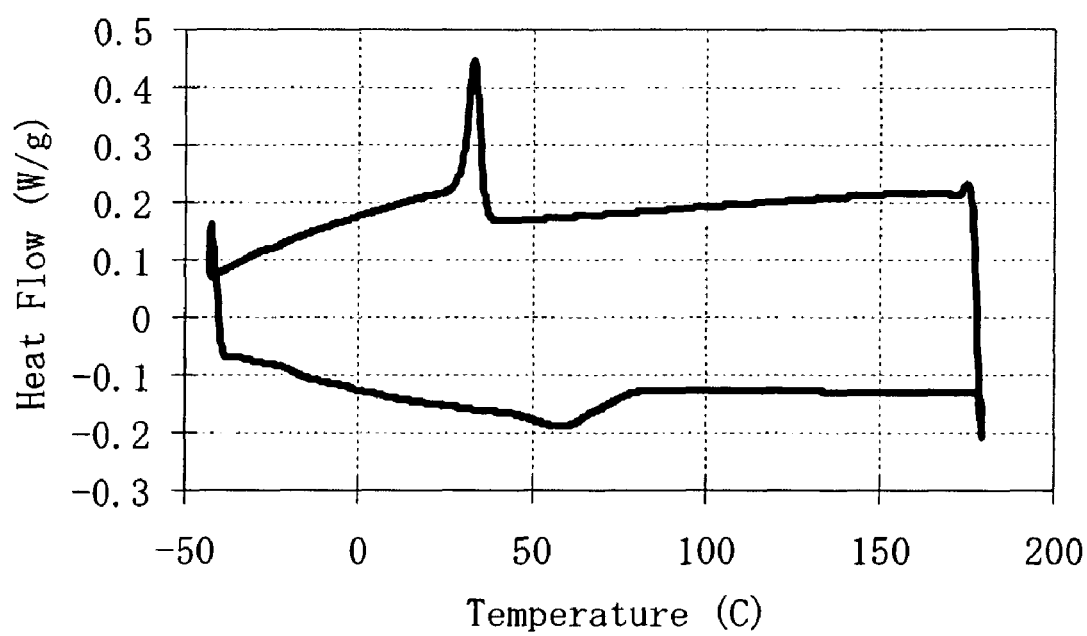
FIG. 12 is a graph showing differential scanning calorimetry results for a tapered tetrablock copolymer.
Figure 13:
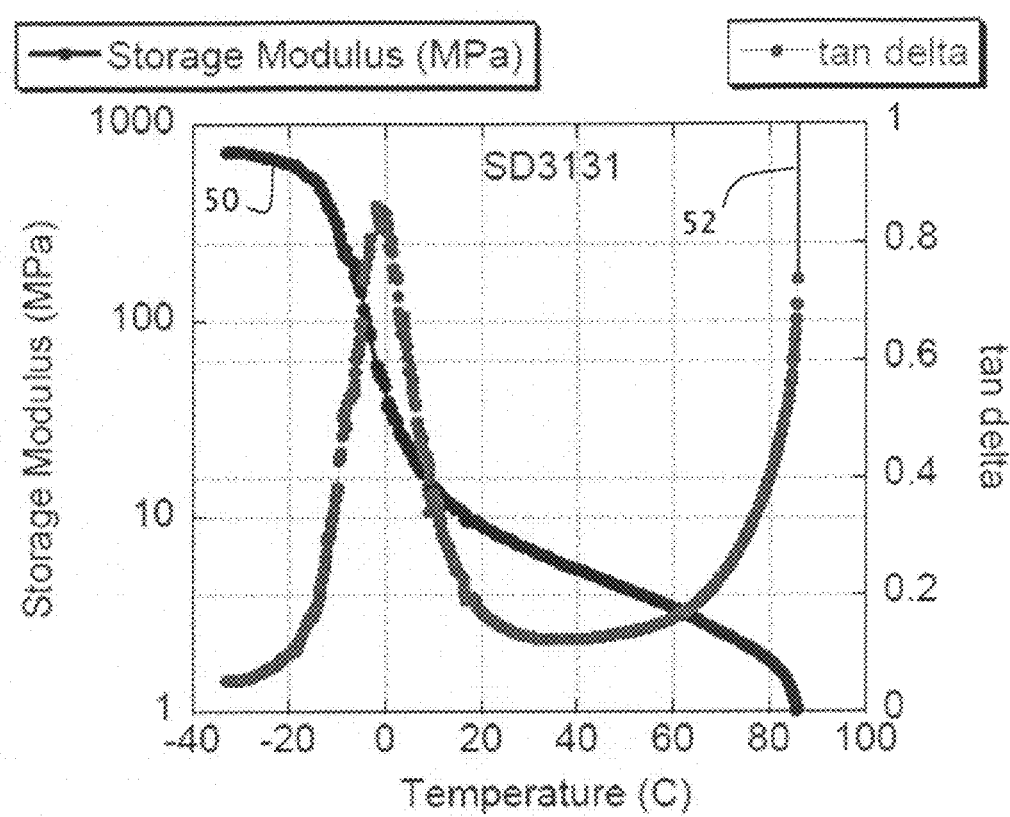
FIG. 13 is a graph of storage modulus and tan δ for a tapered tetrablock copolymer.

Tapered tetrablock copolymers were prepared. These materials show improved mechanical properties at 20° C. and the presence of an elastic block with a reduced glass transition temperature. The experimental method was similar to that of Example 7. The polymerization was started as a typical tapered diblock copolymerization. Then after the desired amount of time had transpired (T1), a second batch of comonomer was added in order to restore the concentration of comonomer in the reaction media to its original value (0.15 M). The amount of comonomer added was estimated as the amount of comonomer consumed in the tapered diblock polymerization (Table 4) where the reaction time is equal to T1 for the tetrablock synthesis. FIG. 12 shows the differential scanning calorimetry (DSC) results on this tetrablock copolymer SD3131 (Mn:96200, Mw:113970, PDI:1.19 and Fe: 0.871). DSC shows that the melting point $T_m$=58.5° C., the crystallization temperature Tc=33° C. and the crystallinity of ethylene Xc=21% (scanning temperature rate dT=5C/min). FIG. 13 depicts the storage modulus an a function of temperature for the SD3131 sample (curve 50), and tan δ of the sample (curve 52). The dynamic mechanical analysis on SD3131 shows a sharp tan δ peak (see curve 52) at Tg=0° C. (glass transition temperature) in heating process (temperature ramp.=3° C./min, frequency=1 Hz). The normal norbornene acetate tetrablock copolymers possess Tg at ~20 C and Tm ranging from 64° C. to 100° C. depending on chain length, so there was a significant drop in Tg for this tetrablock copolymer.

Figure 14:
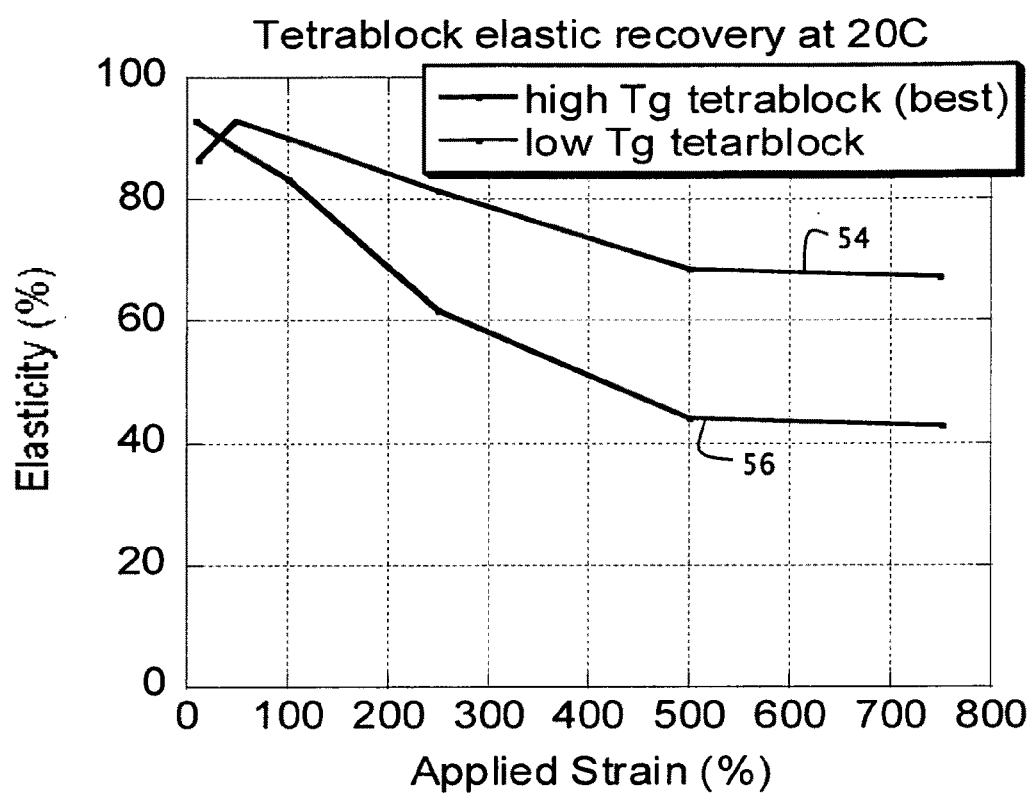
FIG. 14 is a graph comparing the elastic recovery of a tapered tetrablock copolymer containing 5-norbornen-2-yl acetate (high Tg tetrablock) and 5-norbornen-2-yl valerate (low Tg tetrablock).

The tapered tetrablock shows low polydispersity, the expected molecular weight and comonomer content, and greatly improved mechanical properties. FIG. 14 provides the results of elastic recovery for a tapered tetrablock of ethylene and 5-nobomen-2-yl acetate (curve 54), which showed the best elastic behavior at room temperature (table 2, entry 4), and the highly superior elastic behavior at room temperature for our new tapered tetrablock of ethylene and 5-norborne-2-yl valerate (curve 56) (T1=30 minutes, T2=30 minutes, Mn=96 kg/mol, PDI=1.2, and NBV content=13 mol %.) The tapered tetrablock copolymer containing norbornene valerate shows ~70% elastic recovery up to 800% applied strain and is a great improvement over the results seen from tapered tetrablock copolymers containing 5-norbornen-2-yl acetate. This improvement in mechanical behavior is similar to that seen by raising the testing temperature to 65° C. in the norbornene acetate containing tapered tetrablock copolymers (see FIG. 10).

Although the present invention and its advantages have been described in detail, it should be understood that various changes, substitutions and alterations can be made herein without departing from the spirit and scope of the invention. Moreover, the scope of the present application is not intended to be limited to the particular embodiments of the process, manufacture, composition of matter, means, methods and/or steps described in the specification. As one of ordinary skill in the art will readily appreciate from the disclosure of the present invention, processes, manufacture, compositions of matter, means, methods, or steps, presently existing or later to be developed that perform substantially the same function or achieve substantially the same result as the corresponding embodiments described herein may be utilized according to the present invention. Accordingly, the invention is intended to include within its scope such processes, manufacture, compositions of matter, means, methods, or steps.

REFERENCES

The following publications are incorporated herein by reference:
1. Kryszewski, M. *Polym. Adv. Tech.*, 1998, 9, 244-259.
2. Matyjaszewski, K.; Ziegler, M. J.; Arehart, S. V.; Greszta, D.; Pakula, T. *J. Phys. Org. Chem.*, 2000, 13, 775-786.
3. Fayt, R.; Jerome, R.; Teyssie, P. *J Polym. Sci., Polym. Phys. Ed.*, 1982, 20, 2209-2217.
4. Harrats, C.; Fayt, R.; Jerome, R.; Blacher, S. *J Polym. Sci., Part B Polym. Physics*, 2003, 41, 202-216.
5. Harrats, C.; Fayt, R.; Jerome, R. *Polymer*, 2002, 43, 863-873.
6. Lefebvre, M. D.; Olvera de la Cruz, M.; Shull, K. R. *Macromolecules*, 2004, 37, 1118-11123.

7. Laurer, J. H.; Spontak, R. J.; Smith, S. D.; Ashraf, A.; Buoni, D. J.; Lipscomb, G. G. *Polym. Prepr. (Am. Chem. Soc., Div. Polym. Chem.)*, 1994, 35, 657-658.
8. Shull, K. R. *Macromlecules*, 2002, 35, 8631-8639.
9. Aksimentiev, A.; Holyst, R. *J. Chem. Phys.*, 1999, 111, 2329-2339.
10. Hodrokoukes, P.; Floudas, G.; Pispas, S.; Hadjichristidis, N. *Macromolecules*, 2001, 34, 650-657.
11. Neugebauer, D.; Matyjaszewski, K. *Polym. Prepr. (Am. Chem. Soc., Div. Polym. Chem.)*, 2003, 44, 508-509.
12. Buzin, A. I.; Pyda, M.; Costanzo, P.; Matyjaszewski, K.; Wunderlich, B. *Polymer*, 2002, 43, 5563-5569.
13. Greszta, D.; Matyjaszewski, K. *Polym. Prepr. (Am. Chem. Soc., Div. Polym. Chem.)*, 1996, 37, 569-570.
14. Mignard, E.; Leblanc, T.; Bertin, D.; Guerret, O.; Reed, W. F. *Macromolecules*, 2004, 37, 966-975.
15. Gray, M. K.; Nguyen, S. T.; Zhou, H.; Torkelson, J. M. *Polym. Prepr. (Am. Chem. Soc., Div. Polym. Chem.)*, 2002, 43, 112-113.
16. Asai, S. *Polym. Prepr. (Am. Chem. Soc., Div. Polym. Chem.)*, 1996, 37, 706-707.
17. Moctezuma, S. A.; Martinez, E. N. *Polym. Prepr. (Am. Chem. Soc., Div. Polym. Chem.)*, 1996, 37, 637-638.
18. Hashimoto, T.; Tsukahara, Y.; Tachi, Y.; Kawai, H. *Macromolecules*, 1983, 16, 648.
19. Cunningham, R. E. *J. Appl. Polym. Sci.*, 1978, 22, 2907-2913.
20. Ishizu, K.; Sunahara, K.; Asai, S. *Polymer*, 1998, 39, 953.
21. Sardelis, K.; Michels, H. J.; Allen, G. *Polymer*, 1984, 25, 1011-1019.
22. Sardelis, K.; Michels, H. J.; Allen, G. *Polymer*, 1987, 28, 244-250.
23. Yu, G. E.; Mistry, D.; Ludhera, S.; Heatley, F.; Attwood, D.; Booth, C. *J. Chem. Soc., Faraday Trans. 1*, 1997, 93, 3383-3390.
24. Mecking, S.; Johnson, L. K.; Wang, L.; Brookhart, M.; *J. Am. Chem. Soc.* 1998, 120, 888.
25. Younkin, T. R.; Connor, E. F.; Henderson, J. I.; Freidrich, S. K.; Grubbs, R. H.; Bansleben, D. A. *Science* 2000, 287, 460.
26. Connor, E. F.; Younkin, T. R.; Henderson, J. I.; Hwang, S.; Grubbs, R. H.; Roberts, W. P.; Litzau, J. J. *J. Polym Sci. Part A: Polym. Chem.* 2002, 40, 2842.
27. Benedikt, G. M.; Elce, E.; Goodall, B. L.; Kalamarides, H. A.; McIntosh, L. H. III; Rhodes, L. F.; Selvy, K. T.; Andes, C.; Oyler, K.; Sen, A. *Macromolecules* 2002, 35, 8978.
28. Matthew, J. P.; Reinrnuth, A.; Swords, N.; Risser, W. *Macromolecules* 1996, 29, 2755.
29. Goodall, B. L.; McIntosh, L. H.; Rhodes, L. F. *Macromolecular Symp.* 1995, 89, 421.
30. Jansen, J. C., Mendichi, Rl, Locatelli, P. and Tritto, I., Macromol. Rapid Commun. 2001, 22, 1394-1398).
31. Diamanti, S. J.; Ghosh, P.; Shimizu, F.; Bazan, G. C. *Macromolecules* 2003, 9731.
32. Diamanti, S. J.; Khanna V.; Hotta, A.; Yamakawa, D.; Shimizu, F.; Kramer, E. J.; Fredrickson, G. H.; Bazan, G. C. *J. Am. Chem. Soc.* 2004, 126, 10528.
33. Lee, B. Y.; Bazan, G. C.; Vela, J.; Komon, Z. J. A.; Bu, X. *J. Am. Chem. Soc.* 2001, 123, 5352; Schunn, R. A., Ittel, S. D., Cushing, M. A., Inorg. Synth. 1990, 28, 94.

What is claimed is:
1. A method of preparing a polymer, comprising polymerizing a first olefin monomer and a different second olefin monomer in the presence of a group VIII transition metal catalyst, capable of coordination polymerization reaction, under conditions sufficient to produce a tapered block copolymer structure, wherein the catalyst supports living or quasi-living polymerization, wherein at least one of the monomers is a functionalized monomer.

2. A method of preparing a polymer, comprising polymerizing a first olefin monomer and a different second olefin monomer in the presence of a group VIII transition metal catalyst, capable of coordination polymerization reaction, under conditions sufficient to produce a tapered block copolymer structure, wherein the catalyst supports living or quasi-living polymerization, wherein the catalyst comprises a combination of two neutral metal complexes having one of the formulas (I)-(IV):

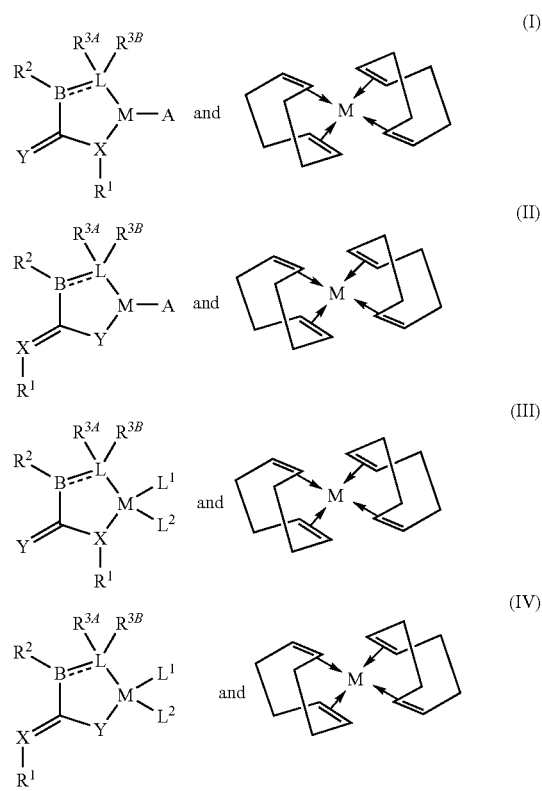

wherein
M is Ni, Pt, or Pd;
A is π-allyl, substituted π-allyl, π-benzyl, or substituted π-benzyl;
X is N or
Y is O, $CH_2$ or S;
L is N or P or a structure capable of forming a two electron donor ligand;
$L^1$ is a neutral monodentate ligand and $L^2$ is a monoanionic monodentate ligand, or $L^1$ and $L^2$ taken together are a monoanionic bidentate ligand;
B is an atom or group of atoms covalently connecting the unsaturated carbon and L;
---represents a single or double bond;
$R^1$, $R^2$, $R^{3A}$ and $R^{3B}$ are each independently hydrogen, a hydrocarbyl group, or a substituted hydrocarbyl group having one or more functional groups or one or more hydrocarbyl groups; and
$R^{3B}$ is nothing when B is connected to L by a double bond.

3. The method of claim 2, wherein $R^1$ and $R^{3A}$ are (2,6-diisopropylphenyl); $R^2$ is methyl; $R^{3B}$ is nothing; X and L are nitrogen; Y is oxygen; B is carbon; -L²- is CH₂Ph; ═ is a double bond; and -L¹- is PMe₃.

4. The method of claim 1, wherein each olefin monomer is selected from the group consisting of R⁴CH═CH₂, cyclopentene, styrene, norbornene, a polar olefin of the general formula H₂C═CR⁵(CH₂)$_S$CO₂R⁶, a substituted cyclopentene, a substituted styrene, and a norbornene derivative having one or more functional groups or having one or more substituted or non-substituted hydrocarbyl groups, wherein R⁴, R⁵ and R⁶ are each independently hydrogen, a hydrocarbyl group, or a substituted hydrocarbyl group having one or more functional groups or having one or more hydrocarbyl groups, and s is an integer from 0 to 100.

5. The method of claim 1, wherein one of the olefin monomers is of the formula R⁷CH═CH₂, wherein R⁷ is hydrogen, a hydrocarbyl group, or a substituted hydrocarbyl group having one or more functional groups or having one or more substituted or non-substituted hydrocarbyl groups.

6. The method of claim 5, wherein R⁷ is hydrogen.

7. A method of preparing a polymer, comprising polymerizing a first olefin monomer and a different second olefin monomer in the presence of a group VIII transition metal catalyst, capable of coordination polymerization reaction, under conditions sufficient to produce a tapered block copolymer structure, wherein the catalyst supports living or quasi-living polymerization, and wherein one of the monomers is a 5-norbonen-2-yl acetate derivative of formula V:

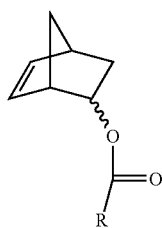

(V)

wherein R is an alkyl group.

8. The method of claim 7, wherein R is a C₁-C₁₇ alkyl group.

9. The method of claim 1, wherein the polymerizing step comprises controlling the addition rate of one or both monomers during the course of polymerization.

10. The method of claim 9, wherein the polymerizing step comprises reducing the first monomer to a level such that incorporation of the first monomer into the polymer becomes essentially zero during the course of polymerization, and providing the second monomer at a level sufficient for incorporation into the polymer throughout the course of polymerization.

11. The method of claim 10, wherein the first monomer is depleted during the course of polymerization.

12. The method of claim 10, wherein the first monomer is added in a single batch at the start of polymerization.

13. The method of claim 10, wherein the second monomer is present at a substantially constant concentration throughout the course of polymerization.

14. The method of claim 10, wherein the second monomer is continuously added throughout the course of the polymerization.

15. A method of preparing a polymer, comprising polymerizing a first olefin monomer and a different second olefin monomer in the presence of a group VIII transition metal catalyst, capable of coordination polymerization reaction, under conditions sufficient to produce a tapered block copolymer structure, wherein the catalyst supports living or quasi-living polymerization, and the polymerizing step comprises reducing the first monomer to a level such that incorporation of the first monomer into the polymer becomes essentially zero during the course of polymerization, and providing the second monomer at a level sufficient for incorporation into the polymer throughout the course of polymerization, and further comprises adding an additional amount of the first monomer to the polymerization reaction after incorporation of the first monomer becomes essentially zero, such that the first monomer is again incorporated into the polymer.

16. The method of claim 15, wherein the step of adding an additional amount of the first monomer is repeated one or more times.

17. A method of preparing a polymer, comprising polymerizing a first olefin monomer and a different second olefin monomer in the presence of a group VIII transition metal catalyst, capable of coordination polymerization reaction, under conditions sufficient to produce a tapered block copolymer structure, wherein the catalyst supports living or quasi-living polymerization, and the polymerizing step comprises reducing the first monomer to a level such that incorporation of the first monomer into the polymer becomes essentially zero during the course of polymerization, and providing the second monomer at a level sufficient for incorporation into the polymer throughout the course of polymerization, and further comprises adding a third olefin monomer to the polymerization reaction after incorporation of the first monomer becomes essentially zero, such that the third monomer is incorporated into the polymer.

18. The method of claim 1, wherein the first and second monomers have different reactivity ratios.

19. A method of preparing a polymer, comprising polymerizing a first olefin monomer and a different second olefin monomer in the presence of a group VIII transition metal catalyst, capable of coordination polymerization reaction, under conditions sufficient to produce a tapered block copolymer structure, wherein the catalyst supports living or quasi-living polymerization, and wherein one monomer is ethylene and the other monomer is 5-norbornene-2-yl acetate or 5-norbornene-2-yl valerate.

20. A method of preparing a polymer, comprising polymerizing a first olefin monomer and a different second olefin monomer in the presence of a catalyst under conditions sufficient to produce a tapered block copolymer structure, wherein the catalyst comprises a combination of two neutral metal complexes having one of the formulas (I)-(IV):

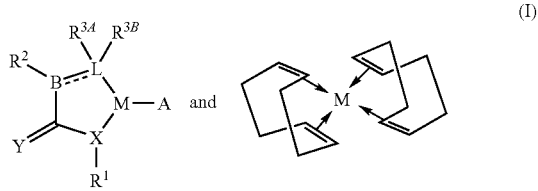

(I)

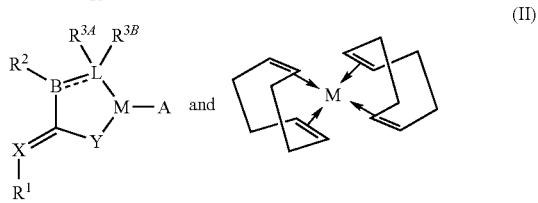

(II)

-continued

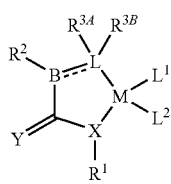 and 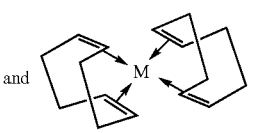 (III)

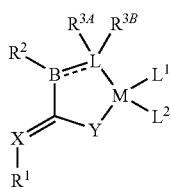 and 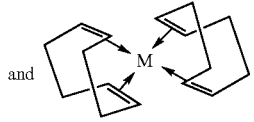 (IV)

wherein

M is Ni, Pt, or Pd;

A is π-allyl, substituted π-allyl, it π-benzyl, or substituted π-benzyl;

X is N or P;

Y is O, $CH_2$ or S;

L is N or P or a structure capable of forming a two electron donor ligand;

$L^1$ is a neutral monodentate ligand and $L^2$ is a monoanionic monodentate ligand, or $L^1$ and $L^2$ taken together are a monoanionic bidentate ligand;

B is an atom or group of atoms covalently connecting the unsaturated carbon and L;

═══ represents a single or double bond;

$R^1$, $R^2$, $R^{3A}$ and $R^{3B}$ are each independently hydrogen, a hydrocarbyl group, or a substituted hydrocarbyl group having one or more functional groups or one or more hydrocarbyl groups; and $R^{3B}$ is nothing when B is connected to L by a double bond; and wherein one monomer is ethylene and the other monomer is 5-norbornene-2-yl acetate or 5-norbornene-2-yl valerate.

* * * * *